US012571314B2

(12) United States Patent
Sibbach et al.

(10) Patent No.: US 12,571,314 B2
(45) Date of Patent: Mar. 10, 2026

(54) COMPOSITE AIRFOIL ASSEMBLY FOR A TURBINE ENGINE

(71) Applicant: GENERAL ELECTRIC COMPANY, Schenectady, NY (US)

(72) Inventors: Arthur William Sibbach, Boxford, MA (US); Nicholas Joseph Kray, Mason, OH (US); Elzbieta Kryj-Kos, Liberty Township, OH (US); Gary Willard Bryant, Jr., Loveland, OH (US); Michael John Franks, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/348,452

(22) Filed: Jul. 7, 2023

(65) Prior Publication Data

US 2025/0012192 A1 Jan. 9, 2025

(51) Int. Cl.

| | |
|---|---|
| ***F01D 5/14*** | (2006.01) |
| ***F01D 5/28*** | (2006.01) |
| ***F04D 29/02*** | (2006.01) |
| ***F04D 29/32*** | (2006.01) |
| ***F04D 29/38*** | (2006.01) |
| ***F04D 29/54*** | (2006.01) |

(52) U.S. Cl.

CPC .......... *F01D 5/147* (2013.01); *F05D 2220/30* (2013.01)

(58) Field of Classification Search

CPC .......... F01D 5/282; F01D 5/147; F01D 5/284; F01D 5/3007; F01D 9/041; F01D 11/008; F01D 9/042; F01D 5/3084; F01D 5/18; F01D 5/184; F01D 5/22; F01D 9/044; F01D 21/045; F01D 5/028; F01D 5/14; F01D 5/188; F01D 5/28; F01D 5/32; F01D 5/34; F05D 2300/603; F05D 2300/6034; F05D 2220/36; F05D 2300/614; F05D 2300/702; F05D 2300/43; F05D 2300/6012; F05D 2220/30; F05D 2220/32; F05D 2260/30; F05D 2260/31; F05D 2230/51; F05D 2260/36; F05D 2260/37; F04D 29/324; F04D 29/023; F04D 29/388; F04D 29/522; F05B 2280/6003

See application file for complete search history.

(56) References Cited

U.S. PATENT DOCUMENTS

| | | | | |
|---|---|---|---|---|
| 1,038,569 A | 9/1912 | Grover | | |
| 2,853,271 A * | 9/1958 | Findley | F01D 5/187 | 416/97 R |
| 3,301,526 A * | 1/1967 | Chamberlain | F01D 5/18 | 415/217.1 |
| 3,501,090 A | 3/1970 | Stoffer et al. | | |
| 4,118,147 A | 10/1978 | Ellis | | |

(Continued)

FOREIGN PATENT DOCUMENTS

| | | |
|---|---|---|
| EP | 1681440 B1 | 8/2013 |
| FR | 3017650 A1 | 8/2015 |

*Primary Examiner* — Eric J Zamora Alvarez
(74) *Attorney, Agent, or Firm* — McGarry Bair PC

(57) ABSTRACT

A composite airfoil assembly for a turbine engine includes an airfoil defining an airfoil interior, and an inner support structure at least partially located within the airfoil interior. The inner support structure can include a first core, a second core, and at least one pin. A laminate overlay surrounds at least a portion of the inner support structure.

20 Claims, 13 Drawing Sheets

(56) References Cited

U.S. PATENT DOCUMENTS

| | | | | |
|---|---|---|---|---|
| 5,269,658 | A | 12/1993 | Carlson et al. | |
| 5,279,892 | A | 1/1994 | Baldwin et al. | |
| 5,736,222 | A | 4/1998 | Childress | |
| 6,431,837 | B1 | 8/2002 | Velicki | |
| 7,008,689 | B2 | 3/2006 | Hawkins et al. | |
| 7,153,096 | B2 * | 12/2006 | Thompson | F01D 5/147 415/200 |
| 7,247,003 | B2 * | 7/2007 | Burke | F01D 5/282 416/241 B |
| 7,326,030 | B2 * | 2/2008 | Albrecht | F01D 5/147 415/115 |
| 8,105,042 | B2 | 1/2012 | Parkin et al. | |
| 8,109,734 | B2 | 2/2012 | Backhouse | |
| 8,419,374 | B2 | 4/2013 | Huth et al. | |
| 8,475,132 | B2 * | 7/2013 | Zhang | F01D 5/284 416/232 |
| 8,499,450 | B2 | 8/2013 | Naik | |
| 8,696,319 | B2 | 4/2014 | Naik | |
| 8,763,360 | B2 | 7/2014 | Murdock | |
| 9,435,209 | B2 | 9/2016 | Garcia Crespo | |
| 9,945,234 | B2 | 4/2018 | Jevons et al. | |
| 9,952,180 | B2 | 4/2018 | Zhang | |
| 10,145,245 | B2 | 12/2018 | Roberge et al. | |
| 10,578,115 | B2 | 3/2020 | Lander et al. | |
| 10,774,005 | B2 * | 9/2020 | Propheter-Hinckley | C04B 35/80 |
| 10,815,795 | B2 * | 10/2020 | Ganiger | F04D 29/388 |
| 11,008,878 | B2 * | 5/2021 | Wong | F01D 5/187 |
| 11,149,553 | B2 | 10/2021 | Whittle et al. | |
| 2003/0129061 | A1 | 7/2003 | Finn et al. | |
| 2005/0158171 | A1 | 7/2005 | Carper et al. | |
| 2011/0052405 | A1 | 3/2011 | Parkin | |
| 2017/0057201 | A1 * | 3/2017 | M'Membe | B32B 7/08 |
| 2018/0178489 | A1 | 6/2018 | M'Membe et al. | |
| 2020/0123915 | A1 | 4/2020 | Husband et al. | |
| 2020/0123916 | A1 | 4/2020 | Husband et al. | |
| 2020/0182066 | A1 | 6/2020 | Theertham | |
| 2022/0074307 | A1 * | 3/2022 | Kray | F01D 5/284 |

* cited by examiner

COMPOSITE AIRFOIL ASSEMBLY FOR A TURBINE ENGINE

TECHNICAL FIELD

The disclosure generally relates to a turbine engine airfoil assembly, and more specifically to a composite airfoil assembly.

BACKGROUND

Turbine engines, and particularly gas or combustion turbine engines, are rotary engines that extract energy from a flow of gases passing through a fan with a plurality of fan blades and into the engine core through a compressor section, a combustor, and a turbine section in axial flow arrangement. The compressor section and turbine section include one or more compressor stages and one or more turbine stages, respectively, with each stage formed by a set of rotating blades adjacent a set of stationary vanes.

During operation, air is drawn into the compressor section by the fan, pressurized by one or more compressor stages in the compressor section, and then mixed with fuel in the combustor for generating hot combustion gases. The combustion gases flow downstream through the turbine section, where the air is expanded and drives rotation of the one or more turbine stages. Rotation of the turbine stages can also drive rotation in the upstream fan and compressor stages.

Turbine engine components, including stationary or rotating components, can include composite materials in some examples. Composite materials typically include a fiber-reinforced matrix and exhibit a high strength-to-weight ratio.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
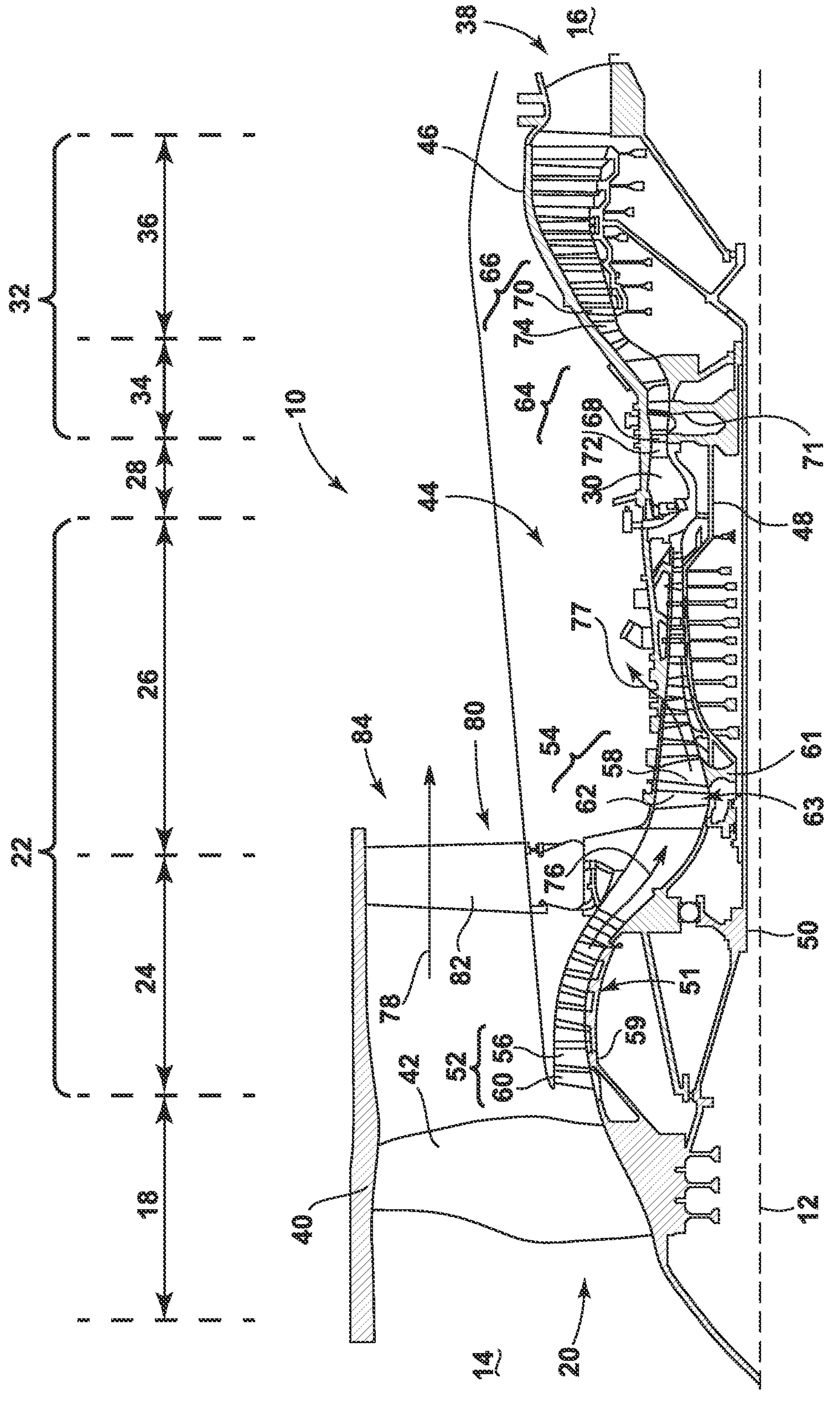
FIG. 1 is a schematic cross-sectional view of a turbine engine in accordance with various aspects described herein.

Aspects of the disclosure herein are directed to a composite airfoil assembly. For the purposes of illustration, the present disclosure will be described with respect to a turbine engine airfoil assembly, and more specifically a composite airfoil assembly within a fan section of the turbine engine. It will be understood, however, that aspects of the disclosure described herein are not so limited and can have general applicability within other engines or within other turbine engine portions. For example, aspects of the disclosure be applicable to composite airfoil assemblies in other engines or vehicles, and can also be used to provide benefits in industrial, commercial, and residential applications.

The composite airfoil assembly can be used at one or more locations within the turbine engine. For example, the composite airfoil assembly is suitable as a fan blade in a fan section of a turbine engine. Other locations, such as the compressor section and turbine section are contemplated. The composite airfoil assembly can be mounted in a variety of ways. One such mounting is securing the blades to a spinner of the fan section, directly, or via a pitch control assembly. Wherever the composite airfoil assembly is located, one suitable mounting is a disk that has complementary slots to receive the dovetail, with the slots circumferentially spaced about the periphery of the disk. The composite airfoil assembly and disk can collectively form a rotating assembly such that the composite airfoil assembly is a composite blade assembly.

As used herein, the term "upstream" refers to a direction that is opposite the fluid flow direction, and the term "downstream" refers to a direction that is in the same direction as the fluid flow. The term "fore" or "forward" can mean in front of something and "aft" or "rearward" can mean behind something. For example, when used in terms of fluid flow, fore/forward refers to an upstream direction and aft/rearward refers to a downstream direction.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

In addition, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is also contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength. One or more layers of adhesive can be used in forming or coupling composite components. Adhesives can include resin and phenolics, wherein the adhesive can require curing at elevated temperatures or other hardening techniques.

As used herein, "polymer matrix composite" or "PMC" refers to a class of materials. By way of example, a PMC material is defined in part by a prepreg, which is a reinforcement material pre-impregnated with a polymer matrix material, such as a thermoset resin or a thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

In one non-limiting example of forming a composite component, multiple layers of prepreg can be stacked to a desired thickness and orientation for the composite component, and the resin can be subsequently cured and solidified to render the fiber-reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

In another non-limiting example, a woven or braided fabric can be used to form a composite component in addition or as an alternative to prepreg layering. One non-limiting example of a woven fabric can include dry carbon fibers woven together with thermoplastic polymer fibers or filaments. One non-limiting example of a braided architecture can include dry carbon fibers and thermoplastic polymer fibers braided together in multiple-strand arrangements. It is possible to tailor various properties of the composite part, such as the fiber volume, material strength, rigidity, impact resistance, or the like in some non-limiting examples, by selecting or tailoring the relative concentrations of the thermoplastic fibers and reinforcement fibers that have been woven or braided together. For instance, in one non-limiting example of a woven composite component having glass fibers, carbon fibers, and thermoplastic fibers, the carbon fiber concentration can be selected for providing material strength, the glass fiber concentration can be selected for enhanced impact resistance, which is a design characteristic for parts located near the inlet of the engine, and the thermoplastic fiber concentration can be selected for binding properties of the fibers in the woven fabric.

In still another non-limiting example, resin transfer molding (RTM) can be used to form a composite component in addition or as an alternative to prepreg, weaving, or braiding. RTM provides one example of an "out-of-autoclave" (OOA) process wherein the composite component can be formed and cured without need of an autoclave curing environment. Generally, RTM includes the application of dry fibers or matrix material to a mold or cavity. The dry fibers or matrix material can include prepreg, braided material, woven material, or any combination thereof. Placement or application of the dry fibers or matrix material can be manual or automated. Resin can be subsequently pumped into or otherwise provided to the mold or cavity to impregnate the dry fibers or matrix material. The combination of the impregnated fibers or matrix material and the resin are then cured and removed from the mold. The dry fibers or matrix material can also be contoured to shape the composite component or direct the resin. In certain examples where prepreg layups are used, the same resin used to form the prepreg layups can also be injected into the mold or cavity to form the composite component in a process known as "Same Qualified Resin Transfer Molding" (SQRTM). It is further contemplated that RTM can be vacuum-assisted in a process known as "Vacuum Assisted Resin Transfer Molding" (VARTM). In such a case, air within the mold can be removed as the resin is drawn into the mold, prior to heating or curing. Optionally, additional layers or reinforcing layers of a material differing from the dry fiber or matrix material can also be included or added prior to heating or curing. In some examples, post-curing processing can be performed on the composite component after removal from the mold.

As used herein, "ceramic matrix composite" or "CMC" refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, or the like. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including, but not limited to, melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the turbine engine 10, which generates combustion gases. The core 44 is surrounded by a core casing 46, which can be coupled with the fan casing 40.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outward relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outward relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor. The bleed air 77 can also be utilized by other systems.

A remaining portion of the airflow, referred to as a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
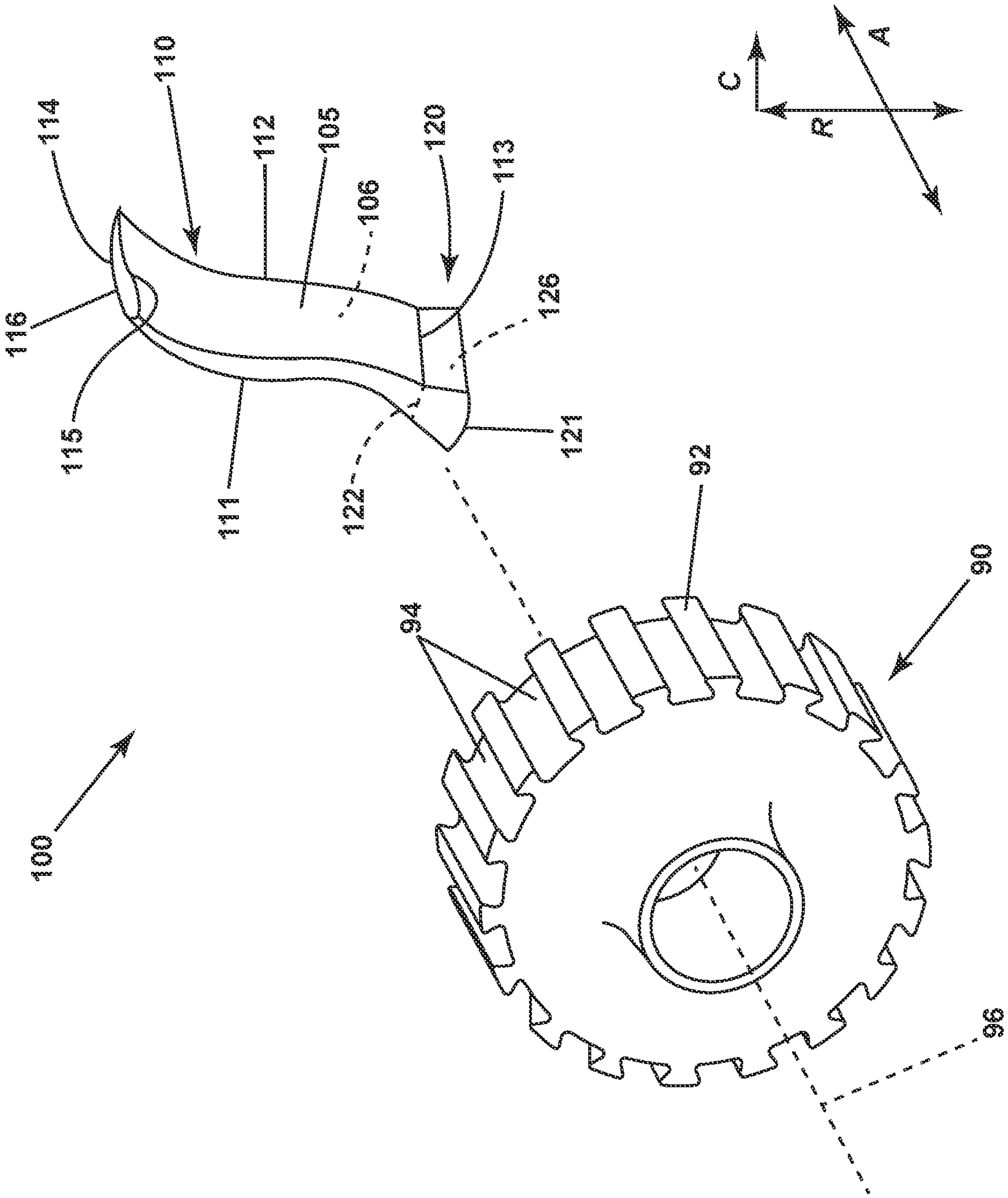
FIG. 2 is a schematic perspective view of a composite airfoil assembly and disk suitable for use within the turbine engine of FIG. 1 in accordance with various aspects described herein.

FIG. 2 is a schematic perspective view of a disk 90 and a composite airfoil assembly 100 (also referred to herein as "airfoil assembly 100") suitable for use within the turbine engine 10 of FIG. 1. The disk 90 is suitable for use as the disk 61, 71 (FIG. 1) or any other disk, such as a disk within the fan section 18 of the turbine engine 10 in a non-limiting example. The airfoil assembly 100 can be rotating or non-rotating such that the airfoil assembly 100 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42. In one non-limiting example, the airfoil assembly 100 can include a composite blade within the fan section 18 (FIG. 1) and configured to rotate within the turbine engine 10 (FIG. 1) at a rotational speed between 1000-2500 RPM during operation.

For reference purposes, a set of relative reference directions along with a coordinate system are shown in FIG. 2 and applied to the airfoil assembly 100 and the disk 90. An axial direction A extends from forward to aft and is shown extending partially into the page. A radial direction R is shown extending perpendicular to the axial direction A. A circumferential direction C is defined circumferentially about the axial direction A. Put another way, the circumferential direction C can be defined as a ray extending locally and orthogonally from the radial direction R as shown.

The disk 90 can include a disk outer surface 92. Multiple slots 94 can be provided in the disk outer surface 92 and arranged circumferentially about the disk 90 as shown. Each slot 94 can be configured to receive a corresponding airfoil assembly 100. In addition, the disk 90 can be rotatable or stationary about an axis 96. In an instance where the disk 90 is stationary, it will be appreciated that the disk 90 can be any suitable stationary portion of the turbine engine that the airfoil assembly 100 is couplable to, such as, but not limited to, a band, a shroud, a casing, or the like. In one non-limiting example, the axis 96 coincides with the engine centerline 12 (FIG. 1). In another non-limiting example, the axis 96 is parallel to the engine centerline 12. In still another non-limiting example, the axis 96 intersects or forms an angle with the engine centerline 12.

In some implementations, the axial direction A can be coincident with the axis 96. In such a case, it is understood that the radial direction R is orthogonal to the axis 96, and the circumferential direction C extends circumferentially about the axis 96. Furthermore, in some implementations, the axial direction A can also be coincident with the engine centerline 12 (FIG. 1). In such a case, the radial direction R is orthogonal to the engine centerline 12 (FIG. 1), and the circumferential direction C extends circumferentially about the turbine engine 10 relative to the engine centerline 12.

The airfoil assembly 100 includes an airfoil 110 defining an airfoil interior 106 and having an exterior surface 105. The exterior surface 105 extends axially between a leading edge 111 and a trailing edge 112, and also extends radially between a root 113 and a tip 114. In the example shown, the airfoil 110 also defines a pressure side 115 and a suction side 116. In another non-limiting example, the airfoil 110 can be a symmetric airfoil such that the exterior surface 105 is axially symmetric.

In the example shown, the airfoil assembly 100 also includes a dovetail 120 extending from the root 113 of the airfoil 110 as shown. The dovetail 120 extends radially between a first end 121 and a second end 122. The first end 121 defines a radially inner surface of the dovetail 120. The second end 122 forms a transition between the dovetail 120 and the airfoil 110. The dovetail 120 also defines a dovetail interior 126 as shown. The airfoil 110 and the dovetail 120 can also be integrally or unitarily formed with each other in some implementations.

The composite airfoil assembly 100 is assembled with the disk 90 by inserting at least a portion of the dovetail 120 axially through a respective slot 94. The airfoil 110 extends radially outward from the slot 94. In some implementations, the second end 122 coincides with the root 113 of the airfoil 110 such that the root 113 is aligned with the disk outer surface 92.

The composite airfoil assembly 100 is held in place by frictional contact with the slot 94 or can be coupled to the slot 94 via any suitable coupling method such as, but not limited to, welding, adhesion, fastening, or the like. While only a single composite airfoil assembly 100 is illustrated, any number of composite airfoil assemblies 100 can be coupled to the disk 90. As a non-limiting example, a plurality of composite airfoil assemblies 100 can be provided corresponding to a total number of slots 94 about the disk 90.

Figure 3:
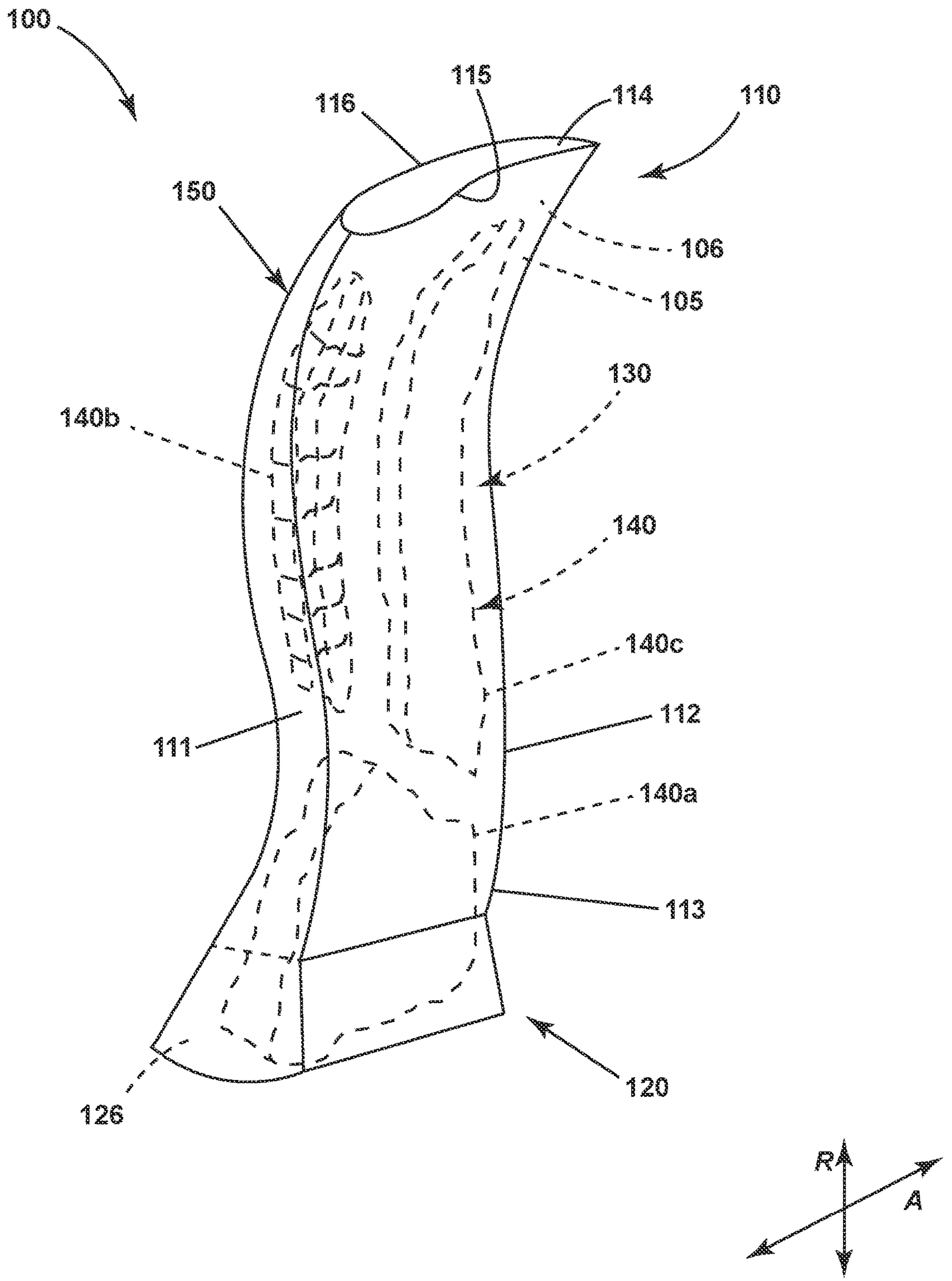
FIG. 3 is a schematic perspective view of the composite airfoil assembly of FIG. 2 and illustrating an inner support structure in accordance with various aspects described herein.

Turning to FIG. 3, the composite airfoil assembly 100 is shown in a schematic perspective view. An inner support structure 130 is provided within the airfoil interior 106 of the airfoil assembly 100. The inner support structure 130 can be positioned within at least one of the airfoil 110 or the dovetail 120. In the non-limiting example shown, the inner support structure 130 extends radially within both the airfoil 110 and the dovetail 120.

The inner support structure 130 can include a plurality of cores 140 (shown in dashed line). The plurality of cores 140 can include one or more composite core materials. In some implementations, at least one core in the plurality of cores 140 can include intertwined fibers defining a three-dimensional core structure. Such intertwined fibers can include, but are not limited to, single-strand fibers, fiber tows, woven fibers, braided fibers, twisted fibers, knitted fibers, yarns, or combinations thereof, that form or define the three-dimensional core structure. For instance, in some implementations, fiber tows can be braided and subsequently interwoven to form the three-dimensional core structure. It is also contemplated that each core in the plurality of cores 140 can include such three-dimensional core structures as described above.

In the example shown, the plurality of cores 140 includes a first core 140*a*, a second core 140*b*, and a third core 140*c*. It is understood that the plurality of cores 140 can include any number of cores, including four or more. In the non-limiting example shown, the first core 140*a* is positioned within the dovetail 120 and extends radially into the airfoil 110 at the root 113. The second core 140*b* is positioned radially outward from the first core 140*a* and extends along the leading edge 111 toward the tip 114. The third core 140*c* is positioned radially outward from the first core 140*a*, and is also arranged axially with the second core 140*b*, such that the third core 140*c* extends along the trailing edge 112 toward the tip 114.

A laminate overlay 150 covers over and surrounds the inner support structure 130, including the first core 140*a*, second core 140*b*, and third core 140*c*. In some implementations, the laminate overlay 150 defines the exterior surface 105 of the composite airfoil assembly 100. In some implementations, the laminate overlay 150 can be at least partially covered by one or more additional layers defining the exterior surface 105.

The laminate overlay 150 can be in the form of a composite skin. As used herein, a "skin" refers to a layer of material having multiple plies or layers of composite materials. The laminate overlay 150 can include multiple stacked composite plies formed by any suitable process, including at least one of pre-impregnated fibers in a polymer matrix, automated fiber placement (AFP), dry fiber placement (DFP), or tailored fiber placement (TFP) in non-limiting examples.

In this manner, the plurality of cores 140 and the laminate overlay 150 can each include composite materials with differing material structures. Some or all cores in the plurality of cores 140 can have corresponding three-dimensional core structures defined by intertwined fibers, such as a woven core structure or a braided core structure as described above. The laminate overlay 150 can include multiple plies arranged in a stack as described above. It is contemplated that a density of the laminate overlay 150 can be greater than a density of the three-dimensional structure of a core in the plurality of cores 140. In a non-limiting example, a core in the plurality of cores 140 can have a three-dimensional core structure with a density between 0.2-1.6 g/cm$^3$, and the laminate overlay 150 can have a density between 1.4-1.6 g/cm$^3$.

Figure 4:
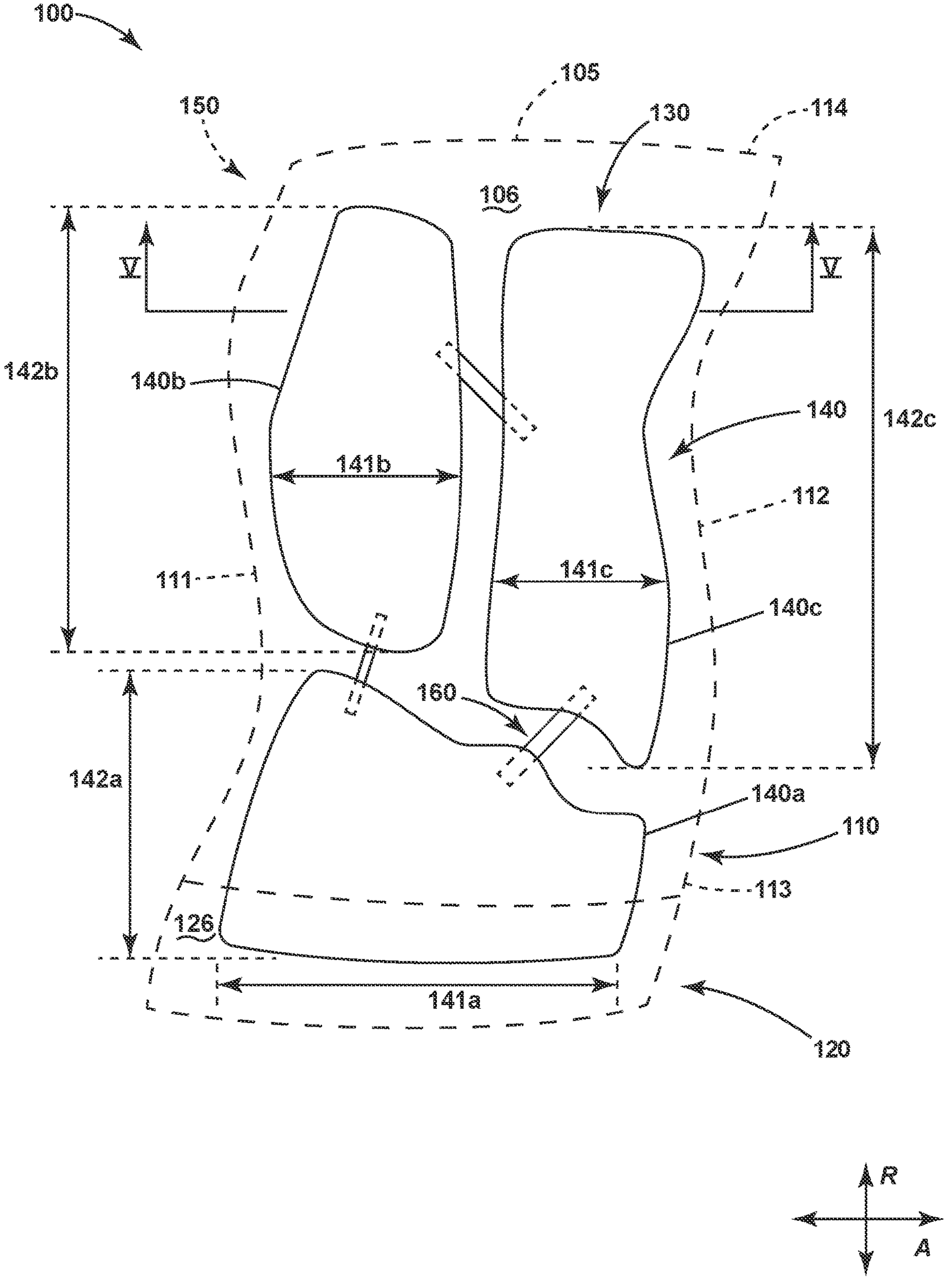
FIG. 4 is a schematic side view of the composite airfoil assembly of FIG. 2 illustrating the inner support structure with a plurality of cores in accordance with various aspects described herein.

Referring now to FIG. 4, a schematic side view of the airfoil assembly 100 is shown. The inner support structure 130 is illustrated in solid line, and the laminate overlay 150 is illustrated in dashed line, including the airfoil 110 and the dovetail 120.

In the example shown, the first core 140*a* is radially spaced from each of the second core 140*b* and the third core 140*c*, and the second core 140*b* is axially spaced from the third core 140*c*, though this need not be the case. It is also contemplated that at least some cores in the plurality of cores 140 can be in an abutting or physical-contact arrangement in some implementations.

The plurality of cores 140 can include cores having identical or differing geometric profiles. As shown, the first core 140*a*, the second core 140*b*, and the third core 140*c* define a respective first core width 141*a*, second core width 141*b*, and third core width 141*c* along the axial direction A. In the non-limiting example shown, an average value of the second core width 141*b* is less than an average value of the first core width 141*a*. In addition, in the non-limiting example shown, an average value of the third core width 141*c* is less than the average value of the first core width 141*a*. It is contemplated that each core in the plurality of cores 140 can have any suitable width, including a constant width or a non-constant width.

In addition, the first core 140*a*, second core 140*b*, and third core 140*c* can each define a respective first height 142*a*, second height 142*b*, and third height 142*c* along the radial direction R. In the non-limiting example shown, an average value of the second height 142*b* is larger than an average value of the first height 142*a*. In addition, in the non-limiting example shown, an average value of the third height 142*c* is larger than the average value of the first height 142*a*. It is contemplated that each core in the plurality of cores 140 can have any suitable height, including a constant height or a non-constant height.

A set of pins 160 can also be provided in the inner support structure 130. The set of pins 160 can be insertable into one or more cores in the plurality of cores 140 for maintaining relative arrangements or positioning, improving stability, or preventing delamination, in non-limiting examples. In the non-limiting example shown, the set of pins 160 includes pins inserted into each of the first, second, and third cores 140*a*, 140*b*, 140*c*. Additionally or alternatively, the set of pins 160 can include a single pin extending through three or more cores in the plurality of cores 140. Additionally or alternatively, the set of pins 160 can include multiple pins inserted into a single core in the plurality of cores 140. Furthermore, while the set of pins 160 are schematically illustrated as being rectangular, it is understood that the set of pins 160 can have any suitable geometric profile including rounded, tapered, flanged, single-pointed end, dual-pointed ends, or the like. It is understood that the set of pins 160 can provide for securing or maintaining a spaced arrangement among the plurality of cores 140 in some examples, or maintaining an abutting arrangement among the plurality of cores 140 in some examples.

Still further, it is understood that additional pins not shown in FIG. 4 can nevertheless be provided in the airfoil assembly 100. Such additional pins can extend in any suitable direction. Such additional pins can also be inserted into or positioned entirely within the laminate overlay 150, spaced from the set of cores 140, providing for increased stability or mitigating potential delamination of the laminate overlay 150.

Figure 5:
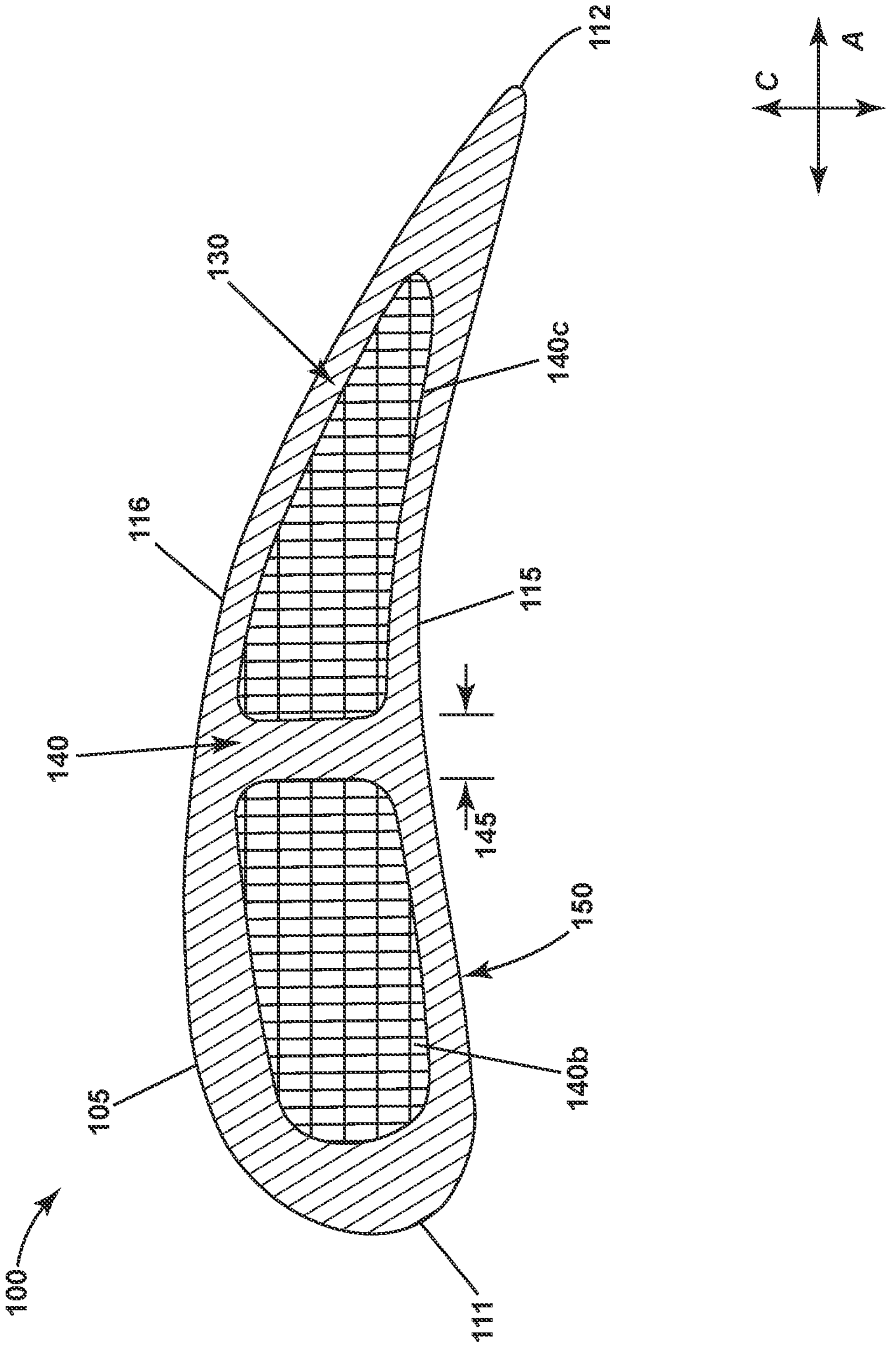
FIG. 5 is a cross-sectional view of the composite airfoil assembly of FIG. 4, taken along line V-V.

FIG. 5 illustrates a cross-sectional view of the airfoil assembly 100 along line V-V of FIG. 4. In this view, the inner support structure 130 is shown with the plurality of cores 140, particularly the second core 140*b* and the third core 140*c*, and with the laminate overlay 150 forming the exterior surface 105.

A local spacing distance 145 can be defined between adjacent cores in the plurality of cores 140. In the example shown, one local spacing distance 145 is illustrated between the second core 140*b* and the third core 140*c*. It is contemplated that the laminate overlay 150 can at least partially fill the local spacing distance 145. In the example shown, the laminate overlay 150 completely fills the local spacing distance 145 such that the second core 140*b* and third core 140*c* are each completely surrounded by the laminate overlay 150. In some implementations, the laminate overlay 150 can partially fill the local spacing distance 145 such that a gap can be present between the second and third cores 140*b*, 140*c*. Additionally or alternatively, a resin material can be introduced into the local spacing distance 145 to form a resin-rich gap between the second and third cores 140*b*, 140*c*.

In addition, the second core 140*b* and the third core 140*c* are each illustrated as having a woven-fiber architecture, e.g., formed using woven-fiber plies, though this need not be the case. It is also contemplated that either or both of the second core 140*b* and the third core 140*c* can include a braided-fiber architecture, e.g., formed using braided-fiber plies, or a combination of woven-fiber plies stacked with braided-fiber plies, in non-limiting examples.

With general reference to FIGS. 1-5, when forming the composite airfoil assembly 100, at least some cores in the plurality of cores 140 can be formed by stacking woven-fiber plies or prepregs, braided-fiber plies or prepregs, or a combination thereof, into a desired core shape to form one or more precursors or layups. The precursor(s) are then cured and optionally shaped, using any suitable method, including by way of an RTM process as described above. The plurality of cores 140 can be subsequently arranged, positioned, or the like, including by way of the set of pins 160 in some examples, thereby forming the inner support structure 130. In some implementations, resin can be applied between adjacent cores in the plurality of cores 140 to at least partially fill local spacing distance(s) 145 in the inner support structure 130. The laminate overlay 150 can then be formed over the inner support structure 130, including by way of RTM processes in some implementations, and the resulting component can be further cured or shaped to form the composite airfoil assembly 100. In addition, the laminate overlay 150 can at least partially fill local spacing distance(s) 145 in the inner support structure 130, including covering over a resin layer within the local spacing distance(s) 145. Furthermore, in some implementations the laminate overlay 150 defines the exterior surface 105 of the composite airfoil assembly 100 as described above. Additionally or alternatively, an additional layer, cover, coating, overlay, or the like can be applied over the laminate overlay 150 and define the exterior surface 105.

Figure 6:
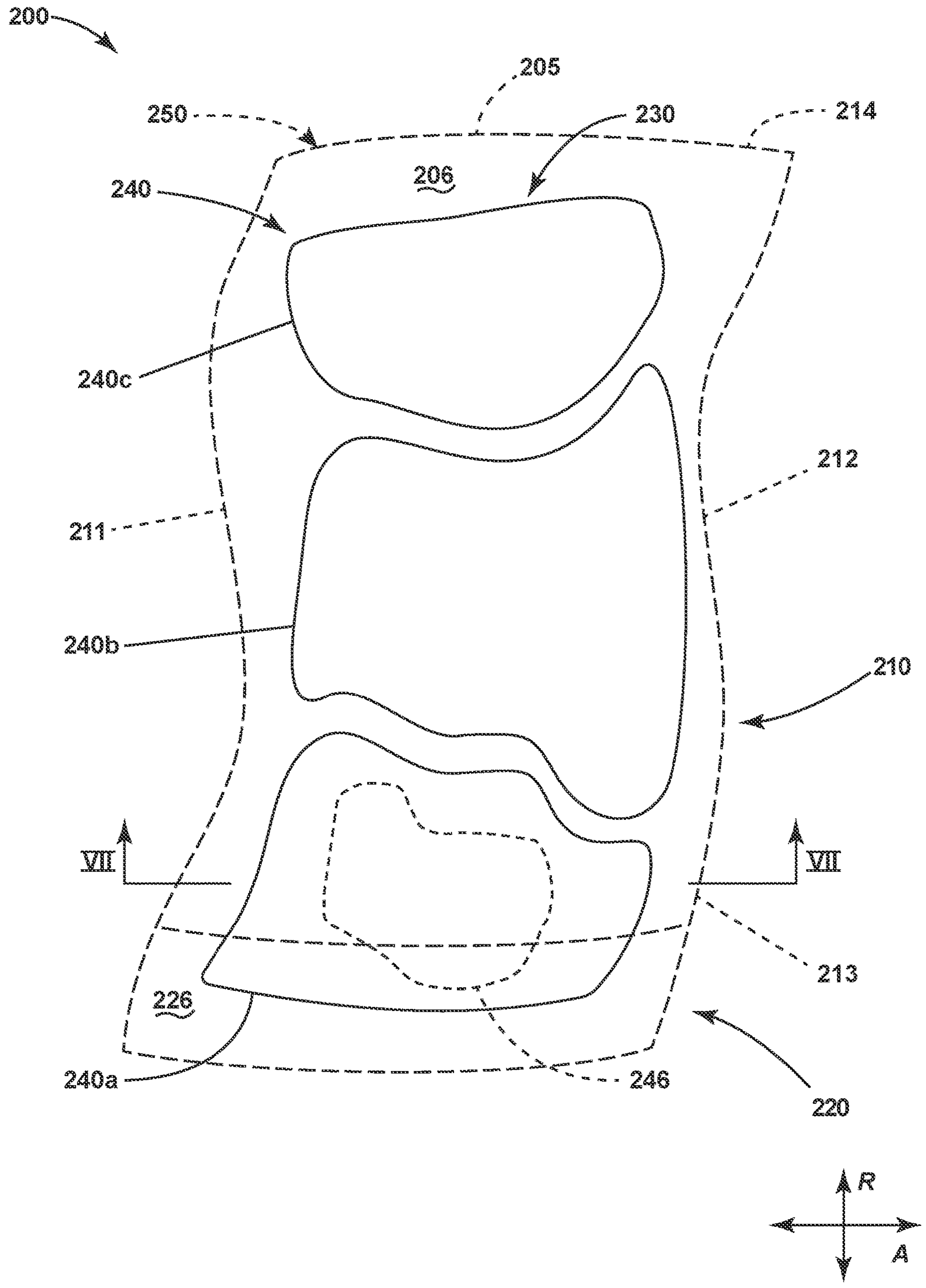
FIG. 6 is a schematic side view of another composite airfoil assembly, suitable for use with the turbine engine of FIG. 1 and the disk of FIG. 2, and illustrating another inner support structure in accordance with various aspects described herein.

Referring now to FIG. 6, another composite airfoil assembly 200 (also referred to herein as "airfoil assembly 200") is illustrated that is suitable for use with the turbine engine of FIG. 1 and the disk of FIG. 2. The airfoil assembly 200 is similar to the airfoil assembly 100. Therefore, the like parts of the airfoil assembly 200 will be described with like numerals increased by 100, with it being understood that the description of the like parts of the airfoil assembly 100 applies to the airfoil assembly 200, except where noted.

The airfoil assembly 200 is shown in a schematic side view. The airfoil assembly 200 includes an airfoil 210 defining an airfoil interior 206 and having an exterior surface 205 (shown in dashed line). The exterior surface 205 extends axially between a leading edge 211 and a trailing edge 212, and also extends radially between a root 213 and a tip 214. The exterior surface 205 can additionally define a pressure side 215 and a suction side 216 (shown in FIG. 7). The airfoil assembly 200 also includes a dovetail 220 extending from the root 213 and defining a dovetail interior 226.

The airfoil assembly 200 includes an inner support structure 230 (shown in solid line) and a laminate overlay 250 defining the exterior surface 205. The inner support structure 230 can include a plurality of cores 240. The plurality of cores 240 can include one or more composite core materials. In some implementations, at least some cores in the plurality of cores 240 can include intertwined fibers defining a three-dimensional core structure. Such intertwined fibers can include single-strand fibers, fiber tows, woven fibers, braided fibers, twisted fibers, knitted fibers, yarns, or combinations thereof, in non-limiting examples. In some implementations, single-strand fibers, fiber tows, woven fibers, braided fibers, twisted fibers, knitted fibers, yarns, or the like can be woven together to form the three-dimensional core structure. In the example shown, the plurality of cores 240 includes a first core 240*a*, a second core 240*b*, and a third core 240*c*. While not shown in FIG. 6, it is contemplated that the inner support structure 230 can include a set of pins similar to the set of pins 160 (FIG. 4).

One difference compared to the airfoil assembly 100 is that the first, second, and third cores 240*a*, 240*b*, 240*c* are radially aligned with the first core 240*a* arranged within the dovetail 210 and the root 213, the third core 240*c* arranged at the tip 214, and the second core 240*b* positioned between the first and third cores 240*a*, 240*c*. Another difference compared to the airfoil assembly 100 is that one or more cores in the plurality of cores 240 can include a central sub-core, structure, or the like. In the example shown, the first core 240*a* includes a sub-core 246 (shown in dashed line).

Figure 7:
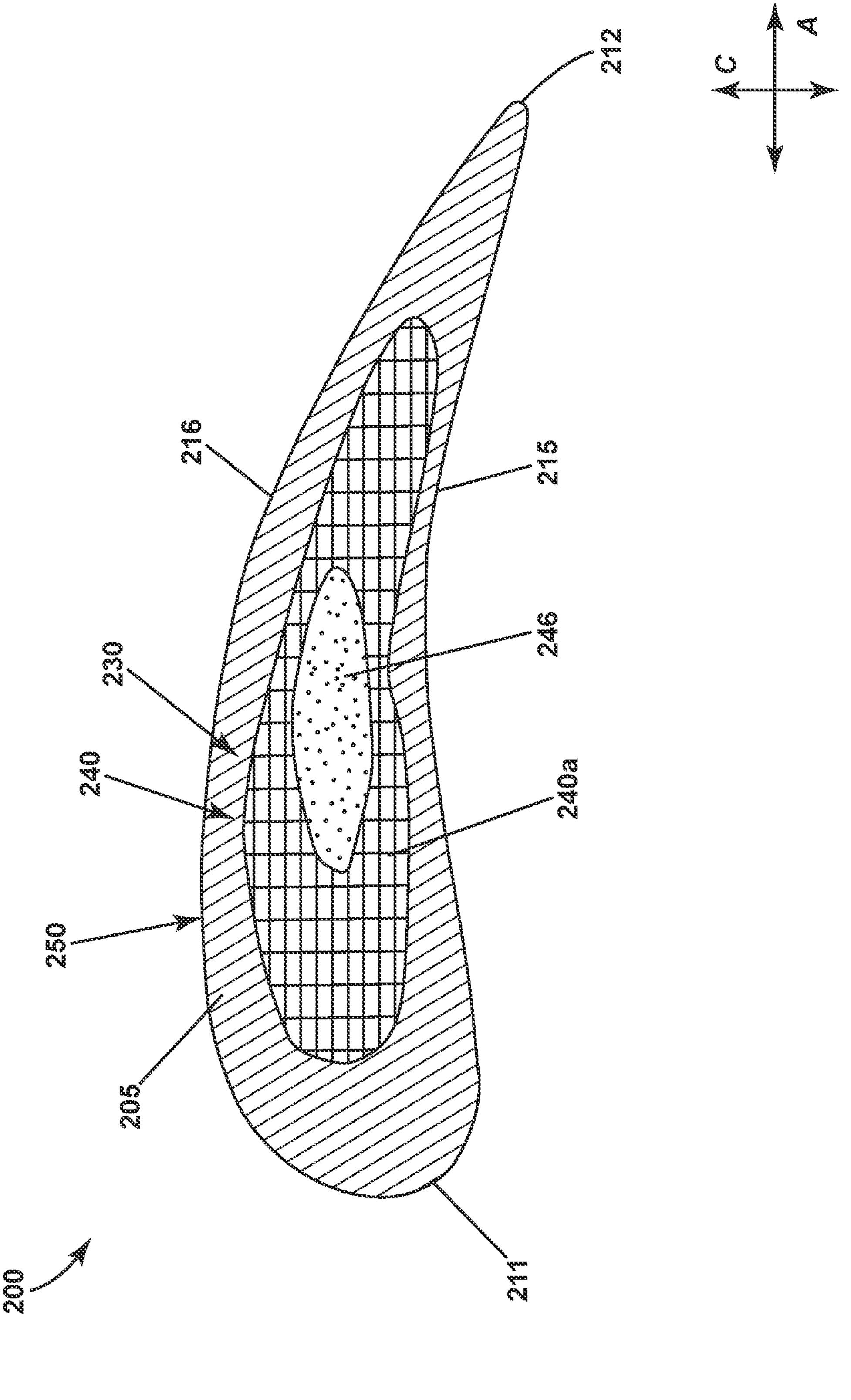
FIG. 7 is a cross-sectional view of the composite airfoil assembly of FIG. 6, taken along line VII-VII.

Turning to FIG. 7, a cross-sectional view of the airfoil assembly 200 illustrates additional details of the sub-core 246, the first core 240*a*, and the laminate overlay 250. It is contemplated that the sub-core 246 can include a lightweight material, including a flexible foam or a rigid foam, including polystyrene foam in a non-limiting example. It is contemplated that the sub-core 246 can have a material density that is less than or equal to a density of the surrounding core material of the first core 240*a*. In one non-limiting example, the first core 240*a* can be formed by applying woven or braided plies over the sub-core 246, and subsequently curing or shaping as described above. In another non-limiting example, the first core 240*a* can be formed by weaving fibers, yarns, braids, tows, or the like in a three-dimensional manner about the sub-core 246. In this manner, the first core 240*a* can be built out to a large overall shape with a reduced weight due to the lightweight sub-core 246. The laminate overlay 250 can be formed or applied over the first core 240*a* and optionally define the exterior surface 205 as described above.

Figure 8:
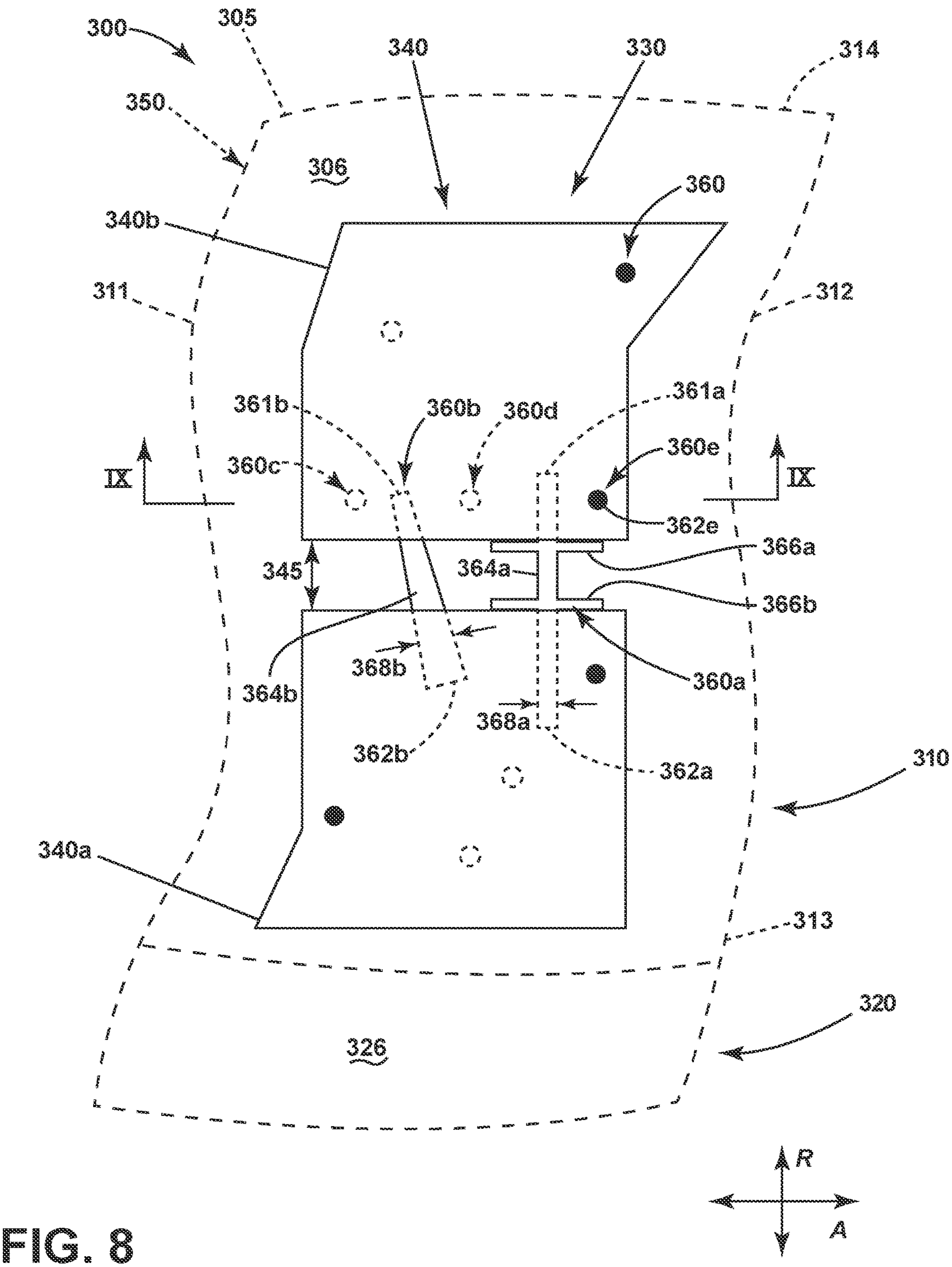
FIG. 8 is a schematic side view of another composite airfoil assembly, suitable for use with the turbine engine of FIG. 1 and the disk of FIG. 2, and illustrating another inner support structure with a set of pins in accordance with various aspects described herein.

Referring now to FIG. 8, another composite airfoil assembly 300 (also referred to herein as "airfoil assembly 300") is illustrated that is suitable for use with the turbine engine of FIG. 1 and the disk of FIG. 2. The airfoil assembly 300 is similar to the airfoil assembly 100 of FIGS. 3-5 and the airfoil assembly 200 of FIGS. 6 and 7. Therefore, the like parts of the airfoil assembly 300 will be described with like numerals further increased by 100, with it being understood that the description of the like parts of the airfoil assembly 100, 200 applies to the airfoil assembly 300, except where noted.

The airfoil assembly 300 is shown in a schematic side view. The airfoil assembly 300 includes an airfoil 310 defining an airfoil interior 306 and having an exterior surface 305 (shown in dashed line). The exterior surface 305 extends axially between a leading edge 311 and a trailing edge 312, and also extends radially between a root 313 and a tip 314. The airfoil assembly 300 also includes a dovetail 320 extending from the root 313 and defining a dovetail interior 326.

The airfoil assembly 300 includes an inner support structure 330 (shown in solid line) and a laminate overlay 350 defining the exterior surface 305. The inner support structure 330 can include a plurality of cores 340. The plurality of cores 340 can include one or more composite core materials. In some implementations, at least some cores in the plurality of cores 340 can include intertwined fibers defining a three-dimensional core structure. Such intertwined fibers can include single-strand fibers, fiber tows, woven fibers, braided fibers, twisted fibers, knitted fibers, yarns, or combinations thereof, in non-limiting examples. In some implementations, single-strand fibers, fiber tows, woven fibers, braided fibers, twisted fibers, knitted fibers, yarns, or the like can be woven together to form the three-dimensional core structure.

In the example shown, the plurality of cores 340 includes a first core 340*a* and a second core 340*b* in a radially-spaced arrangement. A local spacing distance 345 is defined between the first core 340*a* and the second core 340*b* as shown. One difference compared to the airfoil assemblies 100, 200 is that the plurality of cores 340 is fully contained within the airfoil 310 and does not extend into the dovetail 320. It is contemplated that the laminate overlay 350 can be built up, stacked, or the like in the region of the dovetail 320 to fully define the dovetail 320.

A set of pins 360 is provided with the inner support structure 330. Another difference compared to the airfoil assemblies 100, 200 is that the set of pins 360 includes multiple pins having differing insertion depths, alignments, or geometric profiles and inserted into the plurality of cores 340. In the example shown, the set of pins 360 includes a first pin 360*a*, a second pin 360*b*, a third pin 360*c*, a fourth pin 360*d*, and a fifth pin 360*e*. The first pin 360*a*, second pin 360*b*, third pin 360*c*, fourth pin 360*d*, and fifth pin 360*e* respectively include a body 364*a*, 364*b*, 364*c*, 364*d*, 364*e* extending between a respective first end 361*a*, 361*b*, 361*c*, 361*d*, 361*e* and a respective second end 362*a*, 362*b*, 362*c*, 362*d*, 362*e* (shown in FIGS. 8-9).

In the illustrated example, the first and second pins 360*a*, 360*b* are positioned at least radially such that the first ends 361*a*, 361*b* are radially outward of the second ends 362*a*, 362*b*. The first ends 361*a*, 361*b* are inserted into the second core 340*b*, and the second ends 362*a*, 362*b* are inserted into the first core 340*a*. The third, fourth, and fifth pins 360*c*, 360*d*, 360*e* are positioned at least circumferentially in the illustrated example.

At least some pins in the set of pins 360 can be unaligned with one another and extend in different directions within the inner support structure 330. For instance, in the example shown, the first pin 360*a* extends at least radially between the first core 340*a* and the second core 340*b*, and the fourth pin 360*d* extends at least circumferentially within the second core 340*b*. The first and fourth pins 360*a*, 360*d* can be orthogonal to one another in some implementations. In addition, the second pin 360*b* extends both radially and axially between the first and second cores 340*a*, 340*b* in the illustrated example, such that the first, second, and fourth pins 360*a*, 360*b*, 360*d* are all mutually unaligned.

Furthermore, at least some pins in the set of pins 360 can include one or more flanges providing for control of insertion depth into the set of cores 340. In the example shown, the first pin 360*a* includes flanges 366*a*, 366*b* each extending from the body 364*a* and spaced from each of the first and second ends 361*a*, 362*a*. In this manner, the flanges 366*a*, 366*b* can define a predetermined or fixed insertion depth into the corresponding core 340*a*, 340*b* and thereby at least partially define the local spacing distance 345 as shown.

It is contemplated that the set of pins 360 can have any suitable geometric profile, including constant or variable body widths, and including symmetric or asymmetric bodies. In the illustrated example, a portion of the first pin 360*a* defines a body width 368*a* that is constant between the first end 361*a* and the second end 362*a*. Additionally, in the illustrated example, the second pin 360*b* defines a body width 368*b* that continuously increases from the first end 361*b* toward the second end 362*b*.

It is contemplated that a pin in the set of pins 360 can extend to the exterior surface 305, or be fully inserted into the laminate overlay 350 and spaced from the exterior surface 305, or be fully inserted within the set of cores 340 and spaced from the laminate overlay 350, in non-limiting examples. In the example shown, the first and second ends 361*a*, 362*a* of the first pin 360*a* are positioned within the respective second core 340*a* and first core 340*a* and spaced from the laminate overlay 350. In addition, the fourth pin 360*d* can have a second end 362*d* (shown in dashed line) that is located within the second core 340*b*, and the fifth pin 360*e* can have a second end 362*e* that extends out of the second core 340*b* and into the laminate overlay 350. It is understood that the set of pins 360 can extend in any direction through the airfoil assembly 300, including perpendicularly through multiple stacked plies in the laminate overlay 350 or the set of cores 340, or laterally along a ply in the laminate overlay 350 or the set of cores 340, in non-limiting examples.

Figure 9:
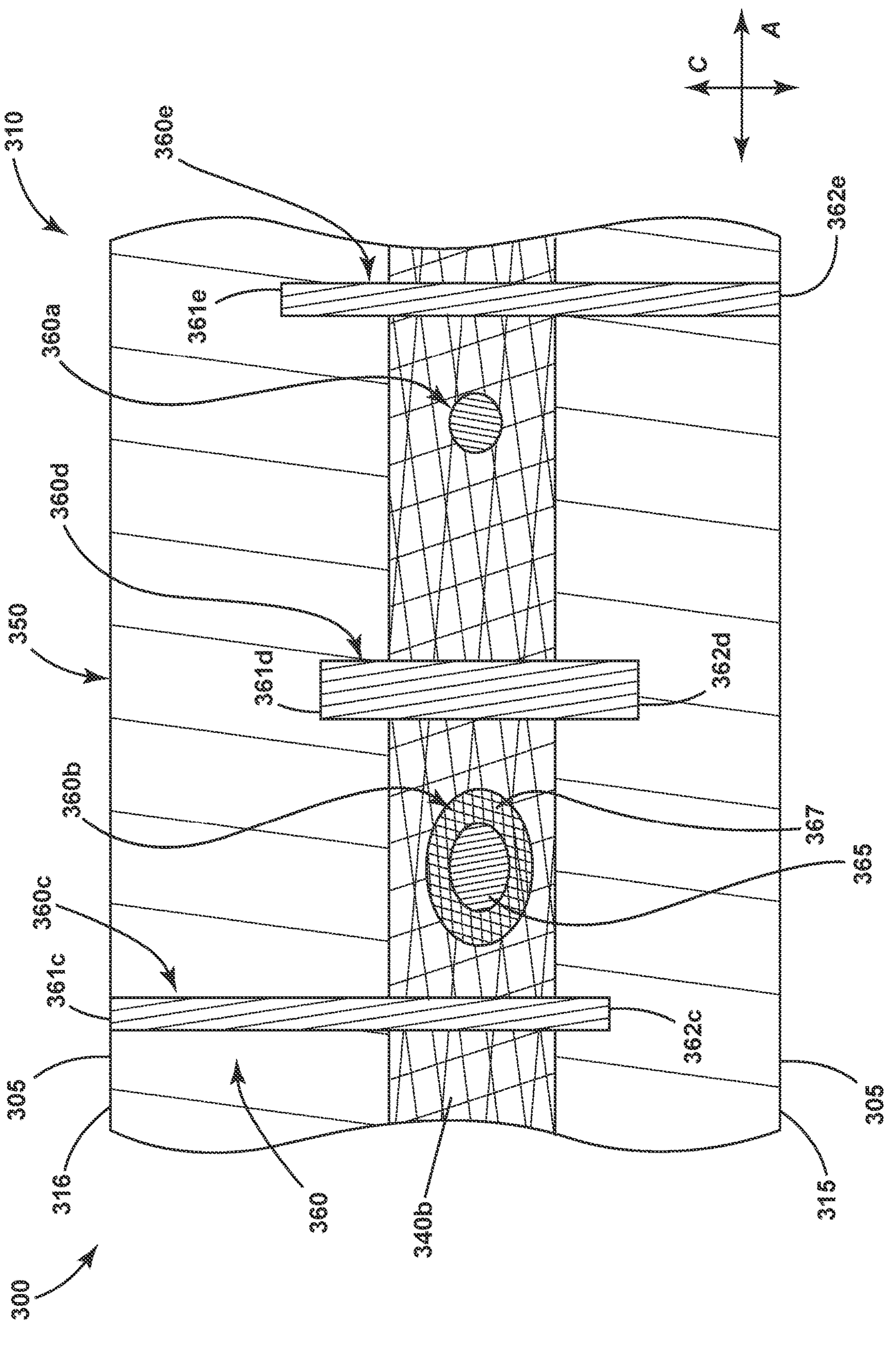
FIG. 9 is a cross-sectional view of the composite airfoil assembly of FIG. 8, taken along line IX-IX.

Turning to FIG. 9, an enlarged cross-sectional view of the airfoil assembly 300 is shown along line IX-IX of FIG. 8. More specifically, the airfoil 310 is shown between the pressure side 315 and the suction side 316 and illustrates the pins 360*a*, 360*c*, 360*c*, 360*d*, 360*e* inserted into the second core 340*b* and laminate overlay 350.

The set of pins 360 can include any suitable material, including metallic compositions, non-metallic compositions, a composite fiber material, or the like. For instance, in a non-limiting example, the first pin 360*a* and the second pin 360*b* can each include a fibrous pin material. Such a fibrous pin material can include woven fibers, twisted fibers, braided fibers, knitted fibers, yarns, tows, or single strands, in non-limiting examples. More particularly, the second pin 360*b* can include a pin core 365 and a fiber overwrap 367. In a non-limiting example, the pin core 365 can be metallic, and the fiber overwrap 367 can include fibers that are at least one of woven or spiral-wrapped about the pin core 365. In a non-limiting example, the fiber overwrap 367 can include at least one of glass fibers or a composite fiber material. In some examples, prepregs can be utilized to form the composite fiber overwrap 367. Regardless of the formation method used, the composite fiber overwrap 367 can be built up to form the second pin 360*b* having a desired width or geometric profile. In this manner, the set of pins 360 can include pins with unitary bodies or layered bodies using single or multiple materials.

As described above, the first pin 360*a* and second pin 360*b* are inserted into the set of cores 340 and are each spaced from the laminate overlay 350. In addition, the third pin 360*c* extends at least circumferentially through the second core 340*b* with the first end 361*c* extending to the exterior surface 305 and with the second end 362*c* located within the laminate overlay 350. The fourth pin 360*d* and the fifth pin 360*e* also extend at least circumferentially through the second core 340*b*. Both ends 361*d*, 362*d* of the fourth pin 360*d*, as well as the first end 361*e* of the fifth pin 360*e*, are positioned within the laminate overlay 350 and spaced from the exterior surface 305. The second end 362*e* of the fifth pin 360*e* extends through the laminate overlay 350 to the exterior surface 305.

In this manner, the inner support structure 330 can include the set of pins 360 extending into or through the set of cores 340, providing for relative positioning or arrangement of the set of cores 340 prior to application of the laminate overlay 350, and also providing for improved stability of the airfoil assembly 300 in operation.

Figure 10:
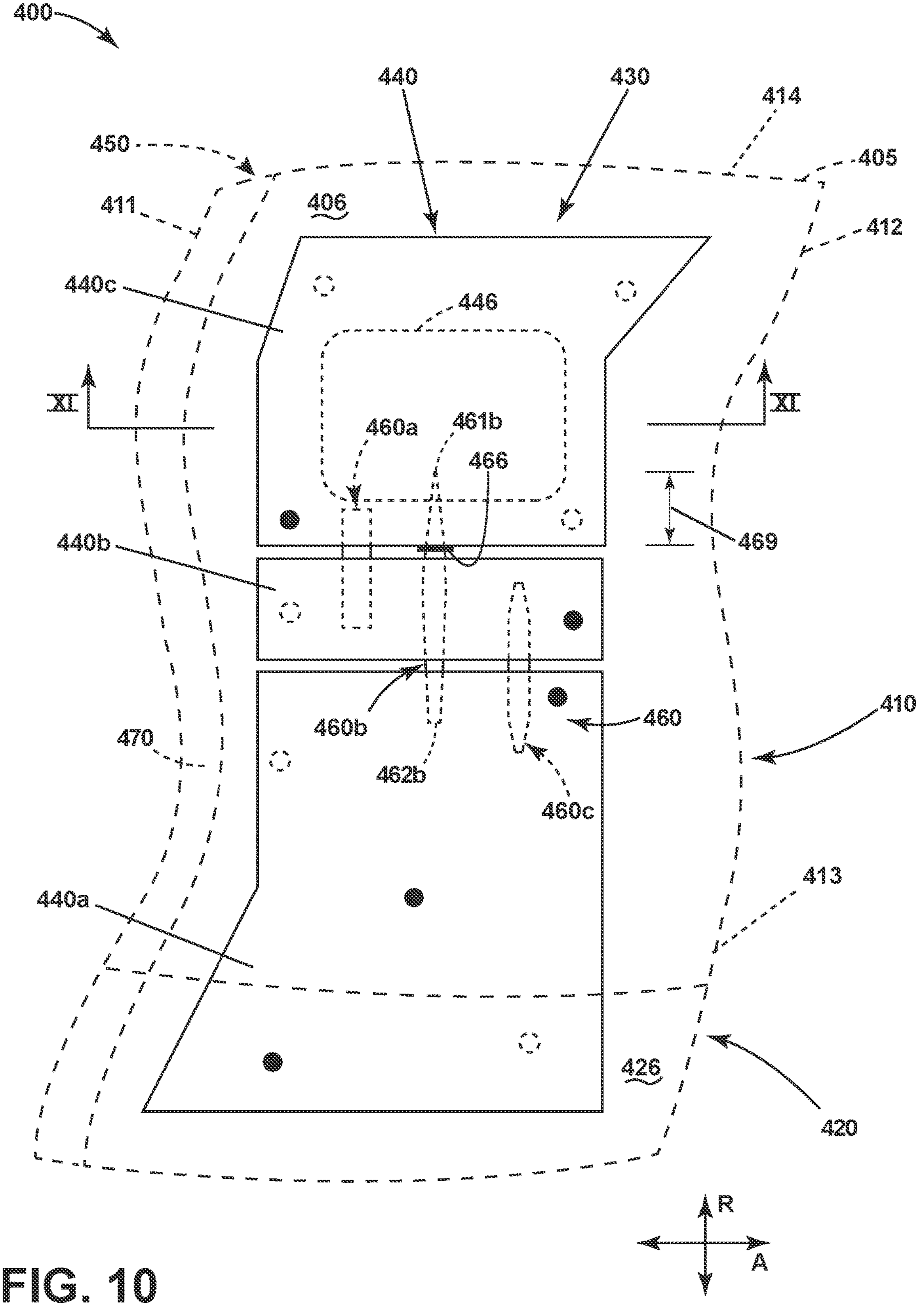
FIG. 10 is a schematic side view of another composite airfoil assembly, suitable for use with the turbine engine of FIG. 1 and the disk of FIG. 2, and illustrating another inner support structure with another set of pins in accordance with various aspects described herein.

Referring now to FIG. 10, another composite airfoil assembly 400 (also referred to herein as "airfoil assembly 400") is illustrated that is suitable for use with the turbine engine of FIG. 1 and the disk of FIG. 2. The airfoil assembly 400 is similar to the airfoil assembly 100 of FIGS. 3-5, the airfoil assembly 200 of FIGS. 6 and 7 and the airfoil assembly 300 of FIGS. 8 and 9. Therefore, the like parts of the airfoil assembly 400 will be described with like numerals further increased by 100, with it being understood that the description of the like parts of the airfoil assemblies 100, 200, 300 applies to the airfoil assembly 400, except where noted.

The airfoil assembly 400 is shown in a schematic side view. The airfoil assembly 400 includes an airfoil 410 defining an airfoil interior 406 and having an exterior surface 405 (shown in dashed line). The exterior surface 405 extends axially between a leading edge 411 and a trailing edge 412, and also extends radially between a root 413 and a tip 414. The airfoil assembly 400 also includes a dovetail 420 extending from the root 413 and defining a dovetail interior 426.

The airfoil assembly 400 includes an inner support structure 430 (shown in solid line) and a laminate overlay 450 defining the exterior surface 405. The inner support structure 430 can include a plurality of cores 440. The plurality of cores 440 can include one or more composite core materials. In some implementations, at least some cores in the plurality of cores 440 can include intertwined fibers defining a three-dimensional core structure. Such intertwined fibers can include single-strand fibers, fiber tows, woven fibers, braided fibers, twisted fibers, knitted fibers, yarns, or combinations thereof, in non-limiting examples. In some implementations, single-strand fibers, fiber tows, woven fibers, braided fibers, twisted fibers, knitted fibers, yarns, or the like can be woven together to form the three-dimensional core structure.

In the example shown, the plurality of cores 440 includes a first core 440*a*, a second core 440*b*, and a third core 440*c* in radial alignment. The first core 440*a* can at least partially form the dovetail 420 and the root 413. The third core 440*c* can at least partially form the tip 414. The third core 440*c* can also include a sub-core 446 similar to the sub-core 246 (FIG. 7). The sub-core 446 can include a lightweight material, including a rigid foam or a flexible foam in some non-limiting examples.

A set of pins 460 can be provided in the inner support structure 430. In the example shown, the set of pins 460 includes a first pin 460*a*, a second pin 460*b*, and a third pin 460*c*. The first pin 460*a* can extend between and couple the second core 440*b* to the third core 440*c*. The third pin 460*c* can extend between and couple the first core 440*a* to the second core 440*b*. One difference compared to the airfoil assemblies 100, 200, 300 is that the second pin 460*b* can extend through three cores. More specifically, the second pin 460*b* includes a first end 461*b* within the third core 440*c*, extends fully through the second core 440*b*, and includes a second end 462*b* within the first core 440*a*. In this manner, at least one pin in the set of pins 460 can extend between and connect at least a first core, a second core, and a third core.

In the example shown, the second pin 460*b* also includes a flange 466 spaced from the first end 461*b*. The flange 466 defines an insertion depth 469 into the third core 440*c*. Another difference compared to the airfoil assemblies 100, 200, 300 is that the second pin 460*b* can extend into the sub-core 446. In particular, the first end 461*b* of the second pin 460*b* is positioned within the sub-core 446 in the non-limiting example shown. It is understood that the insertion depth 469 can be selected, tailored, or the like to position the second pin 460*b* within or through any suitable portion of the inner support structure 430, including extending fully through the sub-core 446 in some implementations.

Figure 11:
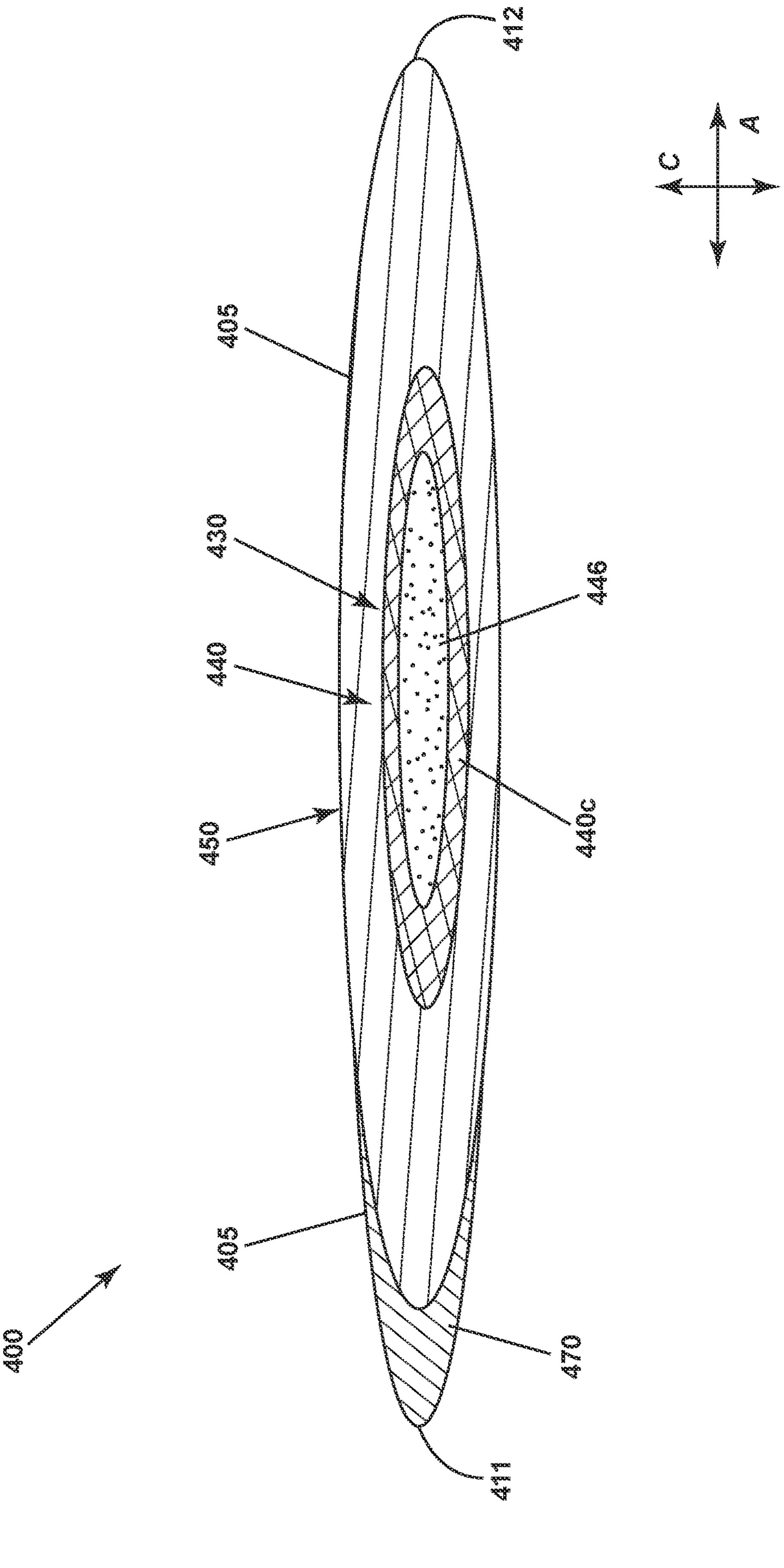
FIG. 11 is a cross-sectional view of the composite airfoil assembly of FIG. 10, taken along line XI-XI.

Another difference compared to the airfoil assemblies 100, 200, 300 is that the airfoil assembly 400 can include a cap or shield 470 over a portion of the laminate overlay 450 and define the leading edge 411. Referring now to FIG. 11, a cross-sectional view of the airfoil assembly 400 illustrates that the shield 470 can extend axially along the laminate overlay 450 and define at least a portion of the exterior surface 405. In some non-limiting examples, the shield 470 can include a metallic material, a composite material, or a combination thereof. In some implementations the shield 470 can also include a single body or multiple discrete bodies that are coupled, bonded, or the like to the laminate overlay 450. In this manner, the shield 470 can provide for increased strength or durability at the leading edge 411.

Another difference compared to the airfoil assemblies 100, 200, 300 is that the airfoil 410 can be in the form of a symmetric airfoil, wherein the exterior surface 405 does not form a pressure side relative to a suction side. It is understood that in some implementations, the airfoil 410 can include pressure and suction sides.

In the illustrated example, the sub-core 446 includes a foam material and is surrounded by the three-dimensional core structure of the third core 440*c*. The laminate overlay 450 surrounds the third core 440*c* and defines a portion of the exterior surface 405. The shield 470 defines the leading edge 411 as described above, and smoothly transitions to the laminate overlay 450.

Figure 12:
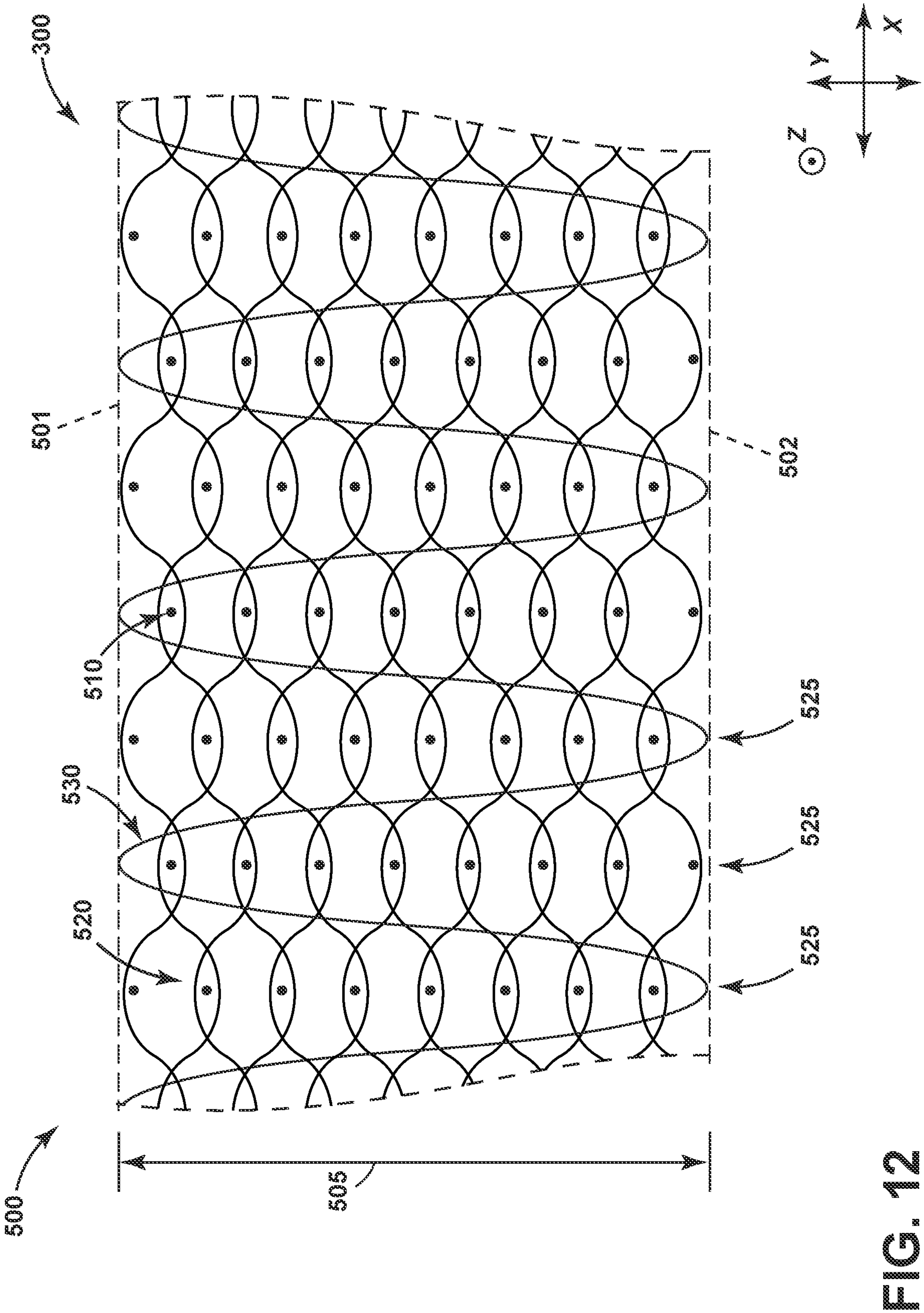
FIG. 12 is a schematic cross-sectional view of a three-dimensional woven material suitable for use in a composite airfoil assembly, including the composite airfoil assembly of FIG. 2, FIG. 6, FIG. 8, or FIG. 10, in accordance with various aspects described herein.

Referring now to FIG. 12, one exemplary woven component 500 is shown that can be utilized in any or all of the airfoil assemblies 100, 200, 300, 400 of FIGS. 3-11, respectively. For instance, the woven component 500 can at least partially form one or more cores in the plurality of cores 140, 240, 340, 440.

A coordinate system is provided for reference and includes a horizontal axis denoted 'X,' a vertical axis denoted 'Y,' and a third axis denoted 'Z' extending out of the page as shown. It will be understood that any of the axes X, Y, Z can align with the axial direction A, the radial direction R, or the circumferential direction C described above.

In the example shown, the woven component 500 defines a first side 501 vertically spaced from a second side 502. A component thickness 505 is defined between the first and second sides 501, 502. In some non-limiting examples, the component thickness 505 can be between 0.1-2 inches, or between 0.5-1 inch, or between 1-2 inches.

The woven component 500 can have a three-dimensional woven structure. More specifically, the woven component 500 can be formed by a three-dimensional weaving process wherein the component thickness 505 is built up during weaving of warp fibers 510, weft fibers 520, and transverse fibers 530. Such a weaving process can utilize a jacquard loom in some implementations. In this manner, the woven component 500 can be formed to near net shape without need of stacking plies to build up component thickness.

As shown, the woven component 500 is illustrated with exaggerated spacing between the warp fibers 510, weft fibers 520, and transverse fibers 530 for visual clarity, and it will be understood that a spacing distance between adjacent fibers in the woven component 500 can be any suitable size, including a tightly-woven configuration with adjacent fibers abutting one another, or a loose-weave configuration with adjacent fibers spaced or lofted from one another. It will also be understood that the warp fibers 510, weft fibers 520, or transverse fibers 530 can include single-strand fibers, fiber tows, woven fibers, braided fibers, twisted fibers, knitted fibers, yarns, or the like, or combinations thereof.

The warp fibers 510 extend out of the page along the Z-axis. In the non-limiting example shown, the warp fibers 510 are oriented to form vertical columns 525 between the first side 501 and the second side 502, with adjacent columns 525 being vertically offset in a staggered arrangement, though this need not be the case. In some non-limiting examples, the warp fibers 510 can form aligned columns, or have a non-symmetric or irregular arrangement or spacing through the woven component 500, or the like.

The weft fibers 520 extend horizontally and are woven through the warp fibers 510, with each weft fiber 520 alternating vertically above and below each successive warp fiber 510 as shown. In addition, in the example shown, adjacent weft fibers 520 are oppositely woven about each warp fiber 510. In this manner, each warp fiber 510 can be vertically positioned between two adjacent weft fibers 520.

The transverse fibers 530 are woven through the warp fibers 510 as well as the weft fibers 520. As shown, the transverse fibers 530 are aligned along the Z-axis and woven vertically about each column 525 of warp fibers 510, extending through all weft fibers 520 between the first side 501 in a through-thickness arrangement, though this need not be the case. In some non-limiting examples, the transverse fibers 530 can be woven vertically through portions of columns 525 such that they do not extend to either or both of the first side 501 or second side 502, or the transverse fibers 520 can have an irregular distribution through the woven component 500, or the like.

In this manner, the woven component 500 can include fibers woven in a three-dimensional manner and having a constant or non-constant fiber spacing, pattern, or the like. Such an arrangement can provide for tailoring of fiber densities, such as a constant or variable fiber density, in different portions of the woven component 500. Such tailoring of fiber densities can provide for tailoring of material properties including material strength, torsion, stiffness, fatigue endurance, weight, or the like.

Figure 13:
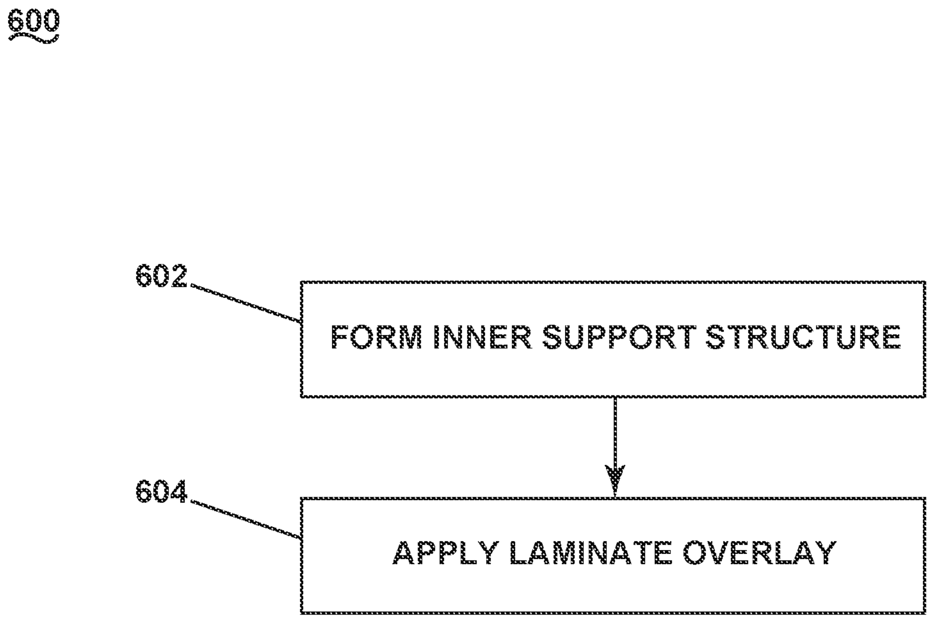
FIG. 13 is a flowchart illustrating a method of forming a composite airfoil assembly in accordance with various aspects described herein.

Turning now to FIG. 13, a flowchart illustrates a method 600 of forming a composite airfoil assembly, such as the composite airfoil assembly 100, 200, 300, 400 of FIGS. 3-11, respectively. The method 600 includes at 602 forming an inner support structure, such as the inner support structure 130, 230, 330, 340, with at least a first core and a second core, such as the first core 140*a*, 240*a*, 340*a*, 440*a*, or the second core 140*b*, 240*b*, 340*b*, 440*b*, each having a core material with at least one of fibers, yarns, braids, or tows.

In some implementations, forming the inner support structure at 602 includes intertwining the core material, such as fibers, yarns, braids, tows, or the like, to define a three-dimensional core structure for at least one of the first core or the second core. Additionally or alternatively, forming the inner support structure at 602 includes weaving fibers, yarns, tows, braids, or the like by a three-dimensional weaving process to define a three-dimensional core structure for at least one of the first core or the second core. Additionally or alternatively, forming the inner support structure at 602 includes weaving three sets of core materials, such as fibers, yarns, braids, tows, or the like, along corresponding three different directions to define a three-dimensionally-woven core structure for at least one of the first core or the second core.

Additionally or alternatively, forming the inner support structure at 602 includes forming at least one of the first core or the second core about a sub-core. Additionally or alternatively, forming the inner support structure at 602 includes positioning at least one of the first core or the second core to at least partially form a dovetail, a root, or a tip of the composite airfoil assembly.

Additionally or alternatively, forming the inner support structure at 602 includes inserting at least one pin, such as the set of pins 460, into the first core and the second core, thereby connecting the first core to the second core. Additionally or alternatively, forming the inner support structure at 602 includes defining a spacing distance between the first core and the second core via the at least one pin. Additionally or alternatively, forming the inner support structure at 602 includes inserting the at least one pin into a sub-core within at least one of the first core or the second core. Additionally or alternatively, forming the inner support structure at 602 includes forming a composite pin by applying a composite material over a metallic pin core.

The method 600 also includes at 604 applying a laminate overlay, such as the laminate overlay 150, 250, 350, 450, to surround at least a portion of the inner support structure. In some implementations, applying the laminate overlay at 604 also includes applying multiple stacked plies over the inner support structure. Additionally or alternatively, applying the laminate overlay at 604 includes forming an exterior surface of the composite airfoil assembly. Additionally or alternatively, applying the laminate overlay at 604 includes at least partially filling a spacing distance, such as the local spacing distance 145, 345, between the first core and the second core with the laminate overlay.

Optionally, the method 600 can include at least partially filling a spacing distance, such as the local spacing distance 145, 345, between the first core and the second core with a resin material. Optionally, applying the laminate overlay at 604 includes covering over the resin material with the laminate overlay.

With general reference to FIGS. 1-13, it is understood that aspects of the disclosure can be mixed, combined, or the like to form various composite airfoil assemblies suitable for use in the turbine engine 10 (FIG. 1). Some additional examples will be described below, with it being understood that such examples are illustrative and do not limit the disclosure in any way.

In one exemplary implementation, an airfoil assembly can include an airfoil defining an airfoil interior and a dovetail defining a dovetail interior as described above. The airfoil assembly can include an inner support structure with multiple cores covered with a laminate overlay as described above. At least one of the multiple cores can be positioned within the airfoil interior alone, within the dovetail interior alone, within both of the airfoil interior and the dovetail interior. At least one of the multiple cores can be formed with intertwined fibers defining a three-dimensional core structure as described above. Optionally, the three-dimensional core structure can have a smaller density compared to the laminate overlay. Optionally, the inner support structure can include at least one pin connecting at least some of the multiple cores together. Optionally, at least one of the multiple cores can include the three-dimensional core structure as well as a sub-core with a different material composition compared to that of the surrounding three-dimensional core structure. Optionally, the sub-core can include a foam material. Optionally, the sub-core can have a smaller density compared to the three-dimensional core structure. Optionally, one of the multiple cores can include a shield forming the leading edge. Optionally, the shield, the sub-core, and the at least one pin can each be provided in a single, common core of the inner support structure.

In another exemplary implementation, an airfoil assembly can include an airfoil defining an airfoil interior and a dovetail defining a dovetail interior as described above. The airfoil assembly can include an inner support structure with multiple cores covered with a laminate overlay as described above. At least one of the multiple cores can be positioned within the airfoil interior alone, within the dovetail interior alone, within both of the airfoil interior and the dovetail interior. At least one of the multiple cores can be formed with a composite core material as described above. The inner support structure can include at least one pin connecting two cores together. The at least one pin can include a composite pin material. Optionally, the at least one pin can include a pin core with a composite overwrap as described above. Optionally, at least one of the two cores connected by the at least one pin can be formed with intertwined fibers defining a three-dimensional core structure as described above.

The described aspects of the present disclosure provide for a variety of benefits. The use of composite materials provides for a lighter airfoil assembly without sacrificing performance of the airfoil assembly when compared to a non-composite (e.g., cast) airfoil assembly. In other words, the materials used for the composite airfoil assembly are lighter than the materials used for the non-composite airfoil assembly and do not sacrifice the ability to perform as intended within the turbine engine. The decreased weight of the airfoil assembly, in turn, means an increased efficiency of the turbine engine when compared to a conventional turbine engine including non-composite airfoil assemblies.

Another benefit is that the use of multiple cores formed with intertwined fibers in a three-dimensional architecture provides for improved durability and material strength across multiple stress and strain directions in operation. The multiple cores additionally provide for a flexible, rearrangeable inner support structure suitable for a variety of blade architectures, which decreases assembly times and increases process efficiency during production.

Another benefit is that the use of a further-lightweight sub-core, as compared to the surrounding composite material in the three-dimensional core structure, provides for an even more lightweight airfoil assembly with additional engine efficiency and performance benefits. The lightweight sub-cores also provide for local inclusion of other strengthening components in the airfoil assembly, such as a shield as described above, while maintaining an overall decreased weight in the airfoil assembly compared to conventional turbine engine airfoil assemblies.

Still another benefit is that the use of fibrous-material pins to connect multiple cores in the inner support structure provides for flexibility in design and reduced production and assembly times, including by way of flanged pins forming predetermined insertion depths into each core. In addition, the use of pins with a pin core and fibrous overwrap provides for added component durability, such as by way of metallic pin cores, while maintaining weight reductions compared to traditional pins. The fibrous overwrap provides additional insulation or material protection, such as preventing oxidation, corrosion, or other material reactions of the inner support structure cores or the pin core, including preventing material reactions that may occur between the inner support structure cores and the pin core.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A composite airfoil assembly for a turbine engine, comprising: an airfoil defining an airfoil interior and having an exterior surface extending axially between a leading edge and a trailing edge and extending radially between a root and a tip; a dovetail extending from the root and defining a dovetail interior; an inner support structure at least partially located within the airfoil interior and comprising a plurality of cores, with each core in the plurality of cores comprising intertwined fibers defining a three-dimensional core structure; and a laminate overlay surrounding at least a portion of the inner support structure and at least partially defining the exterior surface.

A composite airfoil assembly for a turbine engine, comprising: an airfoil defining an airfoil interior and having an exterior surface extending axially between a leading edge and a trailing edge and extending radially between a root and a tip; an inner support structure at least partially located within the airfoil interior and comprising a first core and a second core in radial alignment, with each of the first core and the second core comprising intertwined fibers defining a three-dimensional core structure; and a laminate overlay surrounding at least a portion of the inner support structure.

A composite airfoil assembly for a turbine engine, comprising: an airfoil defining an airfoil interior and having an exterior surface extending axially between a leading edge and a trailing edge and extending radially between a root and a tip; a dovetail extending from the root and defining a dovetail interior; an inner support structure, comprising: a first core and a second core each comprising a composite core material, with at least one of the first core or the second core positioned at least partially within at least one of the airfoil interior or the dovetail interior; and at least one pin extending between and connecting the first core to the second core and comprising a fibrous pin material; and a laminate overlay surrounding at least a portion of the inner support structure and at least partially defining the exterior surface.

A composite airfoil assembly for a turbine engine, comprising: an airfoil defining an airfoil interior and having an exterior surface extending axially between a leading edge and a trailing edge and extending radially between a root and a tip; an inner support structure at least partially located within the airfoil interior, the inner support structure comprising a first core and a second core each comprising a composite core material, and at least one pin extending between and connecting the first core to the second core, the at least one pin comprising a pin core with a fiber overwrap; and a laminate overlay surrounding at least a portion of the inner support structure and at least partially defining the exterior surface.

The composite airfoil assembly of any preceding clause, wherein the plurality of cores comprises a first core and a second core spaced at least radially from the first core.

The composite airfoil assembly of any preceding clause, wherein the plurality of cores further comprises a third core arranged at least one of axially or radially relative to the second core.

The composite airfoil assembly of any preceding clause, wherein the third core is positioned radially outward from the second core and at least partially defines a tip of the composite airfoil assembly.

The composite airfoil assembly of any preceding clause, further comprising a local spacing distance defined between two cores in the plurality of cores, with the local spacing distance at least partially filled by the laminate overlay.

The composite airfoil assembly of any preceding clause, wherein one core in the plurality of cores is positioned at least partially within the airfoil interior, and another core in the plurality of cores is positioned at least partially within the dovetail interior.

The composite airfoil assembly of any preceding clause, wherein the inner support structure comprises a first core defining a first width and a second core defining a second width less than the first width.

The composite airfoil assembly of any preceding clause, wherein the intertwined fibers comprise at least one of woven fibers, braided fibers, twisted fibers, knitted fibers, yarns, tows, or single strands, and wherein the laminate overlay comprises multiple plies formed by at least one of pre-impregnated fibers in a polymer matrix, automated fiber placement, dry fiber placement, or tailored fiber placement.

The composite airfoil assembly of any preceding clause, wherein a core in the plurality of cores comprises a foam sub-core surrounded by the three-dimensional core structure defined by the intertwined fibers.

The composite airfoil assembly of any preceding clause, wherein a density of the laminate overlay is greater than the density of the three-dimensional core structure.

The composite airfoil assembly of any preceding clause, further comprising a dovetail extending from the root and defining a dovetail interior, wherein the first core is positioned at least partially within the dovetail interior, and the second core is positioned at least partially within the airfoil interior.

The composite airfoil assembly of any preceding clause, wherein the inner support structure further comprises a third core arranged at least one of axially or radially with the second core.

The composite airfoil assembly of any preceding clause, wherein the third core is positioned radially outward from the second core.

The composite airfoil assembly of any preceding clause, wherein the third core at least partially defines a tip of the composite airfoil assembly.

The composite airfoil assembly of any preceding clause, further comprising a local spacing distance defined between two of the first core, the second core, or the third core, with the local spacing distance at least partially filled by the laminate overlay.

The composite airfoil assembly of any preceding clause, wherein the intertwined fibers comprise at least one of woven fibers, braided fibers, twisted fibers, knitted fibers, yarns, tows, or single strands, and wherein the laminate overlay comprises multiple plies formed by at least one of pre-impregnated fibers in a polymer matrix, automated fiber placement, dry fiber placement, or tailored fiber placement.

The composite airfoil assembly of any preceding clause, wherein at least one of the first core or the second core comprises a foam sub-core surrounded by the three-dimensional core structure.

The composite airfoil assembly of any preceding clause, wherein a density of the three-dimensional core structure is greater than a density of the foam sub-core.

The composite airfoil assembly of any preceding clause, wherein a density of the laminate overlay is greater than the density of the three-dimensional core structure.

The composite airfoil assembly of any preceding clause, further comprising a shield covering a portion of the laminate overlay and defining the leading edge.

The composite airfoil assembly of any preceding clause, wherein the at least one pin defines a local spacing distance between the first core and the second core.

The composite airfoil assembly of any preceding clause, wherein the local spacing distance is at least partially filled by the laminate overlay.

The composite airfoil assembly of any preceding clause, wherein the fibrous pin material comprises at least one of fiberglass or a fiber composite material.

The composite airfoil assembly of any preceding clause, wherein the at least one pin further comprises a body extending between a first end and a second end, and a flange extending from the body to define an insertion depth into at least one of the first core or the second core.

The composite airfoil assembly of any preceding clause, wherein the flange is spaced from the first and second ends.

The composite airfoil assembly of any preceding clause, wherein at least a portion of the body defines a width that increases from the first end toward the second end.

The composite airfoil assembly of any preceding clause, wherein at least one of the first core or the second core comprises a sub-core.

The composite airfoil assembly of any preceding clause, wherein the at least one pin extends into the sub-core.

The composite airfoil assembly of any preceding clause, wherein the sub-core comprises a foam material.

The composite airfoil assembly of any preceding clause, wherein the at least one pin comprises a first pin extending at least radially between the first core and the second core.

The composite airfoil assembly of any preceding clause, wherein the at least one pin further comprises a second pin extending at least within the second core and unaligned with the first pin.

The composite airfoil assembly of any preceding clause, wherein the inner support structure further comprises a third core, with the at least one pin extending between and connecting the first core, the second core, and the third core.

The composite airfoil assembly of any preceding clause, wherein the fiber overwrap comprises fiberglass wrapped about the pin core.

The composite airfoil assembly of any preceding clause, wherein the at least one pin further comprises a body extending between a first end and a second end, and a flange extending from the body to define an insertion depth into at least one of the first core or the second core.

The composite airfoil assembly of any preceding clause, wherein the flange is spaced from each of the first and second ends.

The composite airfoil assembly of any preceding clause, wherein at least a portion of the body defines a width that increases from the first end toward the second end.

The composite airfoil assembly of any preceding clause, wherein at least one of the first core or the second core comprises a sub-core.

The composite airfoil assembly of any preceding clause, wherein the sub-core comprises a foam material.

The composite airfoil assembly of any preceding clause, wherein the at least one pin extends into the sub-core.

The composite airfoil assembly of any preceding clause, wherein the at least one pin comprises a first pin extending at least radially between the first core and the second core.

The composite airfoil assembly of any preceding clause, wherein the at least one pin further comprises a second pin extending at least within the second core and unaligned with the first pin.

The composite airfoil assembly of any preceding clause, wherein the composite airfoil assembly comprises a composite blade configured to rotate within the turbine engine at a rotational speed between 1000-2500 RPM.

The composite airfoil assembly of any preceding clause, wherein the exterior surface of the airfoil defines a pressure side relative to a suction side.

The composite airfoil assembly of any preceding clause, wherein the exterior surface of the airfoil defines a symmetric airfoil profile.

The composite airfoil assembly of any preceding clause, wherein the first core is positioned at least partially within the dovetail interior.

The composite airfoil assembly of any preceding clause, wherein the shield comprises a metallic material.

The composite airfoil assembly of any preceding clause, wherein the inner support structure further comprises a third core, with the at least one pin extending between and connecting at least two of the first core, the second core, and the third core.

The composite airfoil assembly of any preceding clause, wherein the fibrous pin material comprises at least one of glass fibers or a composite fiber material.

The composite airfoil assembly of any preceding clause, wherein the fiber overwrap comprises fibers that are at least one of spiral-wrapped or braided about the pin core.

A method of forming a composite airfoil assembly, comprising: forming an inner support structure with at least a first core and a second core each having a core material with at least one of fibers, yarns, braids, or tows, and applying a laminate overlay to surround at least a portion of the inner support structure.

The method of any preceding clause, wherein forming the inner support structure comprises intertwining the core material to define a three-dimensional core structure for at least one of the first core or the second core.

The method of any preceding clause, wherein forming the inner support structure comprises weaving the core material by a three-dimensional weaving process to define a three-dimensional core structure for at least one of the first core or the second core.

The method of any preceding clause, wherein forming the inner support structure comprises weaving three sets of core materials along corresponding three different directions to define a three-dimensionally-woven core structure for at least one of the first core or the second core.

The method of any preceding clause, wherein forming the inner support structure comprises forming at least one of the first core or the second core about a sub-core.

The method of any preceding clause, wherein forming the inner support structure comprises positioning at least one of the first core or the second core to at least partially form a dovetail, a root, or a tip of the composite airfoil assembly.

The method of any preceding clause, wherein forming the inner support structure comprises inserting at least one pin into the first core and the second core, thereby connecting the first core to the second core.

The method of any preceding clause, wherein forming the inner support structure comprises defining a spacing distance between the first core and the second core via the at least one pin.

The method of any preceding clause, wherein forming the inner support structure comprises inserting the at least one pin into a sub-core within at least one of the first core or the second core.

The method of any preceding clause, wherein forming the inner support structure comprises forming a composite pin by applying a composite material over a metallic pin core.

The method of any preceding clause, wherein applying the laminate overlay comprises applying multiple stacked plies over the inner support structure.

The method of any preceding clause, wherein applying the laminate overlay comprises forming an exterior surface of the composite airfoil assembly.

The method of any preceding clause, wherein applying the laminate overlay comprises at least partially filling a spacing distance between the first core and the second core with the laminate overlay.

The method of any preceding clause, further comprising at least partially filling a spacing distance between the first core and the second core with a resin material.

The method of any preceding clause, wherein applying the laminate overlay comprises covering over the resin material with the laminate overlay.

What is claimed is:

1. A composite airfoil assembly for a turbine engine, comprising:

an airfoil defining an airfoil interior and having an exterior surface extending axially between a leading edge and a trailing edge and extending radially between a root and a tip;

a dovetail extending from the root and defining a dovetail interior; and an inner support structure at least partially located within the airfoil interior and comprising:

a first core and a second core each comprising a composite core material, with at least one of the first core or the second core positioned at least partially within at least one of the airfoil interior or the dovetail interior; and at least one pin extending between and connecting the first core to the second core and comprising a fibrous pin material;

wherein the at least one pin defines a local spacing distance between the first core and the second core.

2. The composite airfoil assembly of claim 1, wherein the fibrous pin material comprises at least one of fiberglass or a fiber composite material.

3. The composite airfoil assembly of claim 1, wherein the at least one pin further comprises a body extending between a first end and a second end, and a flange extending from the body to define an insertion depth into at least one of the first core or the second core.

4. The composite airfoil assembly of claim 3, wherein the flange is spaced from the first end and the second end.

5. The composite airfoil assembly of claim 1, wherein the at least one pin further comprises a body extending between a first end and a second end and at least a portion of the body defines a width that increases between the first end and the second end.

6. The composite airfoil assembly of claim 1, wherein at least one of the first core or the second core comprises a foam sub-core.

7. The composite airfoil assembly of claim 1, wherein the at least one pin comprises a first pin extending at least radially between the first core and the second core.

8. The composite airfoil assembly of claim 7, wherein the at least one pin further comprises a second pin extending at least within the second core and unaligned with the first pin.

9. The composite airfoil assembly of claim 1, wherein the inner support structure further comprises a third core, with the at least one pin comprising a single pin extending between and connecting the first core, the second core, and the third core.

10. A composite airfoil assembly for a turbine engine, comprising:

an airfoil defining an airfoil interior and having an exterior surface extending axially between a leading edge and a trailing edge and extending radially between a root and a tip; and an inner support structure at least partially located within the airfoil interior, the inner support structure comprising a first core and a second core each comprising a composite core material, and at least one pin extending between and connecting the first core to the second core, the at least one pin comprising a pin core with a fiber overwrap;

wherein the at least one pin defines a local spacing distance between the first core and the second core.

11. The composite airfoil assembly of claim 10, wherein the fiber overwrap comprises fiberglass wrapped about the pin core.

12. The composite airfoil assembly of claim 10, wherein the at least one pin further comprises a body extending between a first end and a second end, and a flange extending from the body to define an insertion depth into at least one of the first core or the second core.

13. The composite airfoil assembly of claim 12, wherein the flange is spaced from each of the first end and the second end.

14. The composite airfoil assembly of claim 10, wherein the at least one pin further comprises a body extending between a first end and a second end and at least a portion of the body defines a width that increases between the first end and the second end.

15. The composite airfoil assembly of claim 10, wherein at least one of the first core or the second core comprises a sub-core with a foam material.

16. The composite airfoil assembly of claim 10, wherein the at least one pin comprises a first pin and a second pin, the second pin extending at least within the second core and unaligned with the first pin.

17. A composite airfoil assembly for a turbine engine, comprising:

an airfoil defining an airfoil interior and having an exterior surface extending axially between a leading edge and a trailing edge and extending radially between a root and a tip;

a dovetail extending from the root and defining a dovetail interior; and an inner support structure at least partially located within the airfoil interior and comprising:

a first core and a second core each comprising a composite core material, with at least one of the first core or the second core positioned at least partially within at least one of the airfoil interior or the dovetail interior; and at least one pin extending between and connecting the first core to the second core and comprising a fibrous pin material, the at least one pin having a body extending between a first end and a second end, with at least a portion of the body defining a width that increases between the first end and the second end.

18. The composite airfoil assembly of claim 17, wherein the first core is spaced from the second core and a portion of the body extending between the first core and the second core defines at least part of the width increasing between the first end toward the second end.

19. The composite airfoil assembly of claim 17, wherein the width increases continuously between the first end toward the second end.

20. The composite airfoil assembly of claim 1, further comprising a laminate overlay surrounding at least a portion of the inner support structure and at least partially defining the exterior surface.

* * * * *